US007325086B2

(12) United States Patent
Kong et al.

(10) Patent No.: US 7,325,086 B2
(45) Date of Patent: Jan. 29, 2008

(54) METHOD AND SYSTEM FOR MULTIPLE GPU SUPPORT

(75) Inventors: Roy (Dehai) Kong, Cupertino, CA (US); Wen-Chung Chen, Cupertino, CA (US); Ping Chen, San Jose, CA (US); Irene (Chih-Yiieh) Cheng, San Jose, CA (US); Tatsang Mak, Milpitas, CA (US); Xi Liu, Shanghai (CN); Li Zhang, ShangHai (CN); Li Sun, Shanghai (CN); Chenggang Liu, Shanghai (CN)

(73) Assignee: Via Technologies, Inc., Hsin-Tien, Taipei (TW)

( * ) Notice: Subject to any disclaimer, the term of this patent is extended or adjusted under 35 U.S.C. 154(b) by 105 days.

(21) Appl. No.: 11/300,980

(22) Filed: Dec. 15, 2005

(65) Prior Publication Data

US 2007/0139423 A1 Jun. 21, 2007

(51) Int. Cl.
*G06F 13/40* (2006.01)

(52) U.S. Cl. ...................................... 710/307; 345/503

(58) Field of Classification Search ........ 710/306–307; 345/502–503, 520

See application file for complete search history.

(56) References Cited

U.S. PATENT DOCUMENTS

| | | | | |
|---|---|---|---|---|
| 5,331,315 | A | 7/1994 | Crosette | |
| 5,371,849 | A | 12/1994 | Peaslee et al. | 345/553 |
| 5,430,841 | A | 7/1995 | Tannenbaum et al. | 345/502 |
| 5,440,538 | A | 8/1995 | Olsen | |
| 5,973,809 | A | 10/1999 | Okayama | |
| 6,208,361 | B1 | 3/2001 | Gossett | 345/536 |
| 6,437,788 | B1 | 8/2002 | Milot et al. | 345/552 |
| 6,466,222 | B1 | 10/2002 | Kao et al. | 345/558 |
| 6,674,841 | B1 | 1/2004 | Johns et al. | 379/67.1 |
| 6,782,432 | B1 | 8/2004 | Nelson et al. | 710/1 |
| 6,919,896 | B2 | 7/2005 | Sasaki et al. | |
| 6,956,579 | B1 * | 10/2005 | Diard et al. | 345/537 |
| 6,985,152 | B2 * | 1/2006 | Rubinstein et al. | 345/520 |
| 7,174,411 | B1 | 2/2007 | Ngai | |
| 2002/0073255 | A1 | 6/2002 | Davidson et al. | 710/104 |
| 2002/0172320 | A1 | 11/2002 | Chapple | 377/44 |

(Continued)

OTHER PUBLICATIONS

ATI CrossFire Technology White Paper—15 pages—Jun. 14, 2005.

*Primary Examiner*—Clifford Knoll
(74) *Attorney, Agent, or Firm*—Thomas, Kayden, Horstemeyer & Risley

(57) ABSTRACT

Supporting multiple graphics processing units (GPUs) comprises a first path coupled to a north bridge device (or a root complex device) and a first GPU, which may include a portion of the first GPU's total communication lanes. A second communication path may be coupled to the north bridge device and a second GPU and may include a portion of the second GPU's total communication lanes. A third communication path may be coupled between the first and second GPUs directly or through one or more switches that can be configured for single or multiple GPU operations. The third communication path may include some or all of the remaining communication lanes for the first and second GPUs. As a nonlimiting example, the first and second GPUs may each utilize an 8-lane PCI express communication path with the north bridge device and an 8-lane PCI express communication path with each other.

18 Claims, 17 Drawing Sheets

U.S. PATENT DOCUMENTS

2003/0001848 A1 1/2003 Doyle et al. ................ 345/501
2003/0058249 A1 3/2003 Malka et al. ............... 345/582
2003/0142037 A1 7/2003 Pinedo et al. ................ 345/1.1
2004/0252126 A1 12/2004 Margittai et al. ........... 345/535
2005/0024385 A1 2/2005 Gruber ....................... 345/606
2005/0088445 A1* 4/2005 Gonzalez et al. ........... 345/502
2005/0270298 A1 12/2005 Thieret
2006/0095593 A1* 5/2006 Kranich ......................... 710/4
2006/0098020 A1 5/2006 Shen et al.

* cited by examiner

METHOD AND SYSTEM FOR MULTIPLE GPU SUPPORT

CROSS-REFERENCE TO RELATED APPLICATIONS

This application is related to the following U.S. utility patent application, which is entirely incorporated herein by reference: U.S. patent application Ser. No. 11/300,705, entitled "SWITCHING METHOD AND SYSTEM FOR MULTIPLE GPU SUPPORT," filed on Dec. 15, 2005.

TECHNICAL FIELD

The present disclosure relates to graphics processing and, more particularly, to a method and system for supporting multiple graphics processor units by converting one link to multiple links.

BACKGROUND

Current computer applications are more graphically intense and involve a higher degree of graphics processing power than their predecessors. Applications such as games typically involve complex and highly detailed graphics renderings that involve a substantial amount of ongoing computations. To match the demands made by consumers for increased graphics capabilities in computing applications, such as games, computer configurations have also changed.

As computers, particularly personal computers, have been programmed to handle ever-increasing demanding entertainment and multimedia applications, such as high definition video and the latest 3-D games, increasing demands have been placed on system bandwidth. To meet these changing requirements, methods have arisen to deliver the bandwidth needed for current bandwidth hungry applications, as well as providing additional headroom, or bandwidth, for future generations of applications.

This increase in bandwidth has been realized in recent years in the bus system of the computer's motherboard. A bus is comprised of conductors that are hardwired onto a printed circuit board that comprises the computer's motherboard. A bus may be typically split into two channels, one that transfers data and one that manages where the data has to be transferred. This internal bus system is designed to transmit data from any device connected to the computer to the processor and memory.

One bus system is the PCI bus, which was designed to connect I/O (input/output) devices with the computer. PCI bus accomplished this connection by creating a link for such devices to a south bridge chip with a 32-bit bus running at 33 MHz.

The PCI bus was designed to operate at 33 MHz and therefore able to transfer 133 MB/s, which is recognized as the total bandwidth. While this bandwidth was sufficient for early applications that utilized the PCI bus, applications that have been released more recently have suffered in performance due to this relatively narrow bandwidth.

More recently, a new interface known as AGP, Advanced Graphics Port, was introduced for 3-D graphics applications. Graphics cards coupled to computers via an AGP 8× link realized bandwidths approximately at 2.1 GB/s, which was a substantial increase over the PCI bus described above.

Even more recently, a new type of bus has emerged with an even higher bandwidth over both PCI and AGP standards. A new standard, which is known as PCI Express, is typically known to operate at 2.5 GB/s, or 250 MB/s per lane in each direction, thereby providing a total bandwidth of 10 GB/s in a 20-lane configuration. PCI Express (which may be abbreviated herein as "PCIe") architecture is a serial interconnect technology that is configured to maintain the pace with processor and memory advances. As stated above, bandwidths may be realized in the 2.5 GHz range using only 0.8 volts.

At least one advantage with PCI Express architecture is the flexible aspect of this technology, which enables scaling of speeds. When combining the links to form multiple lanes, PCIe links can support ×1, ×2, ×4, ×8, ×12, ×16, and ×32 lane widths. Nevertheless, in many desktop applications, motherboards may be populated with a number of ×1 lanes and/or one or even two ×16 lanes for PCIe compatible graphics cards.

FIG. 1 is a nonlimiting exemplary diagram 10 of at least a portion of a computing system, as one of ordinary skill in the art would know. In this partial diagram of a computing system 10, a central processing unit, or CPU 12, may be coupled by a communication bus system, such as the PCIe bus described above. In this case, a north bridge chip 14 and south bridge chip 16 may be interconnected by various types of high-speed paths 18 and 20 with the CPU and each other in a communication bus bridge configuration.

As a nonlimiting example, one or more peripheral devices 22*a*-22*d* may be coupled to north bridge chip 14 via an individual pair of point-to-point data lanes, which may be configured as ×1 communication paths 24*a*-24*d*, as described above. Likewise, a south bridge chip 16, as known in the art, may be coupled by one or more PCIe lanes 26*a* and 26*b* to peripheral devices 28*a* and 28*b*, respectively.

A graphics processing device 30 (which may hereinafter be referred to as GPU 30) may be coupled to the north bridge chip 14 via a PCIe 1×16 link 32, which essentially may be characterized as 16×1 PCIe links, as described above. Under this configuration, the 1×16 PCIe link 32 may be configured with a bandwidth of approximately 4 GB/s.

Even with the advent of PCIe communication paths and other high bandwidth links, graphics applications have still reached limits at times due to the processing capabilities of the processors on devices such as GPU 30 in FIG. 1. For that reason, computer manufacturers and graphics manufacturers have sought solutions that add a second graphics processing unit to the hardware configuration to further assist in the rendering of complicated graphics in applications such as 3-D games and high definition video, etc. However, in applications involving multiple GPUs, methods of inter-GPU communication have posed numerous problems for hardware designers.

FIG. 2 is an alternate embodiment computer 34 of the computer 10 of FIG. 1. In this nonlimiting example of FIG. 2, graphics processing operations are handled by both GPU 30 and GPU 36, which are coupled via PCIe links 33 and 38, respectively. As a nonlimiting example, each of PCIe links 33 and 38 may be configured as ×8 links. However, in this nonlimiting example, GPUs 30 and 36 should be configured so as to communicate with each other so as not to duplicate efforts and to also handle all graphics processing operations in a timely manner.

Thus, in one nonlimiting application, GPU 30 and GPU 36 should be configured to operate in harmony with each other. In at least one nonlimiting example, as shown in FIG. 2, computer 34 may be configured such that GPUs 30 and 36 communicate with each other via system memory 42, which itself may be coupled to north bridge chip 14 via links 44 and 47, which may be ×1 links, as similarly described above. In this configuration, GPU 30 may communicate with GPU 36 via link 33 to north bridge chip 14, which may forward communications to system memory via link 44. Communications may thereafter be routed back through north bridge chip 14 via communication path 47 and on to GPU 36 via ×8 PCIe link 38. In this configuration, each of GPU 30 and 36 may share ×8 PCIe bandwidth via links 33 and 38, thereby consuming some of the bandwidth that may otherwise be used for graphics rendering. Also, inter-GPU traffic may suffer long latency times in this nonlimiting example due to the routing through north bridge chip 14 and the system memory 42. Furthermore, this configuration may suffer from extra system memory traffic.

FIG. 3 is yet another nonlimiting approach for a computer 40 to support multiple GPUs 30 and 36, as described above. In this nonlimiting example, north bridge chip 14 may be configured to support GPU 30 and GPU 36 via an 8-lane PCIe link 33 and another 8-lane PCIe link 38 coupled to GPUs 30 and 36, respectively. In this nonlimiting example, north bridge chip 14 may be configured to support port-to-port communications between GPUs 30 and 36. To realize this configuration, north bridge chip 14 may be configured with an additional number of gates, thereby decreasing the performance of north bridge chip 14. Plus, inter-GPU traffic may suffer from medium to substantial latencies for communications that travel between GPU 30 and 36, respectively. Thus, this configuration for computer 40 is also not desirable and optimal.

Thus, there is a heretofore-unaddressed need to overcome the deficiencies and shortcomings described above.

SUMMARY

This disclosure describes a system and method related to supporting multiple graphics processing units (GPUs), which may be positioned on one or multiple graphics cards coupled to a motherboard. The system and method disclosed herein comprises a first path coupled to a north bridge device (or a root complex device) and a first GPU, which may include a portion of the first GPU's total communication lanes. As a nonlimiting example, the first path may be coupled to connection points 0-7 of the first GPU (in a 16 lane configuration) and to connection points 0-7 of the northbridge device.

A second path may be coupled to the north bridge device and a second GPU and may include a portion of the second GPU's total communication lanes. As a nonlimiting example, the second path may be coupled to connection points 0-7 of the second GPU and connection points 8-15 of the north bridge device.

A third communication path may be coupled between the first and second GPUs directly or through one or more switches that can be configured for single or multiple GPU operations. In one nonlimiting example, the third path may be coupled to connection points 8-15 on each of the first and second GPUs. However, the third communication path may include some or all of the remaining communication lanes for the first and second GPUs. As a nonlimiting example, the first and second GPUs may each utilize an 8-lane PCI express communication path with the north bridge device and an 8-lane PCI express communication path with each other.

If the second GPU is not utilized, as a nonlimiting example, switches on the graphics cards or the motherboard may be controlled so that connection points 8-15 of the first GPU are coupled to connection points 8-15 of the north bridge device. In this nonlimiting example, the one or more switches may include one or more multiplexing and/or demutiplexing devices.

Other systems, methods, features, and advantages of the present disclosure will be or become apparent to one with skill in the art upon examination of the following drawings and detailed description. It is intended that all such additional systems, methods, features, and advantages be included within this description, be within the scope of the disclosure, and be protected by the accompanying claims.

DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 4:
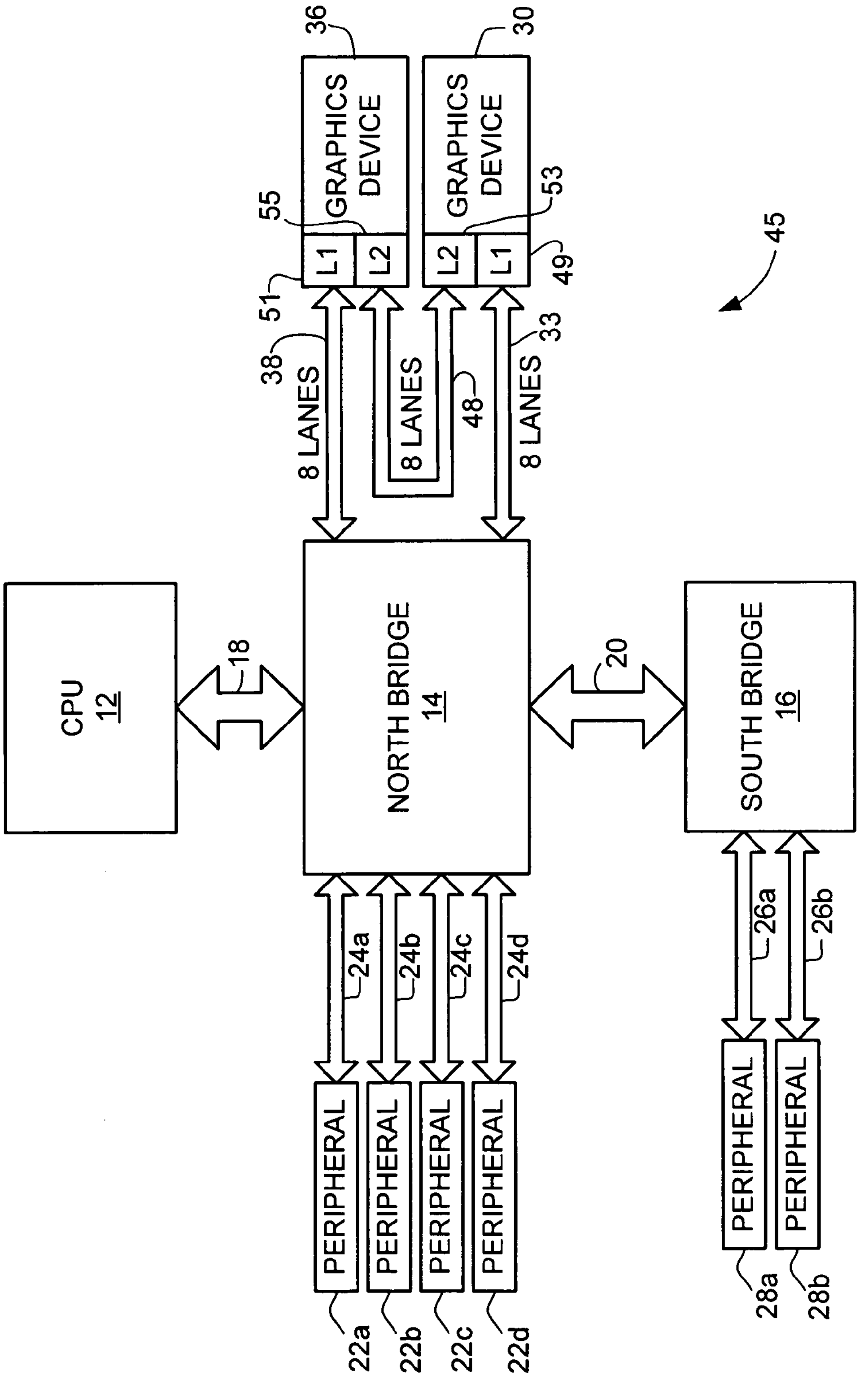
FIG. 4 is a diagram of the computer of FIG. 1 configured with multiple graphics processors coupled by an additional private PCIe interface.

As described above, configuring multiple graphics processors provides a difficult set of problems involving inter-GPU traffic and the coordination of graphics processing operations so that the multiple graphics processors operate in harmony. FIG. 4 is a diagram of computer 45 configured with multiple graphics processors coupled by an additional private PCIe interface 48.

In this nonlimiting example, GPUs 30 and 36 are coupled to north bridge chip 14 via two 8-lane PCIe interfaces 33 and 38, respectively, as described above. More specifically, GPU 30 may be coupled to north bridge chip 14 via 8-lane PCI interface 33 at link interface 1, which is denoted as referenced numeral 49 in FIG. 4. Likewise, GPU 36 may be coupled via 8-lane PCIe interface 38 to north bridge chip 14 at link 1 (L1), which is denoted as reference numeral 51.

An additional PCIe interface 48 may be coupled between a second link interfaces 53 and 55 for each of GPUs 30 and 36, respectively. In this way, each of GPUs 30 and 36 communicate with each other via this second PCIe interface 48 without involving north bridge chip 14, system memory, or other components in computer 45. In this configuration, inter-GPU traffic realizes low latency times, as compared to the configurations described above. In addition, 16 lanes of PCIe bandwidth are utilized between the GPUs 30 and 36 and north bridge chip 14 via PCIe interfaces 33 and 38. In this nonlimiting example, PCIe interface 48 is configured with 8 PCIe lanes, or at ×8. However, one of ordinary skill in the art would know that this interface linking each of GPUs 30 and 36 could be scalable to one or more different lane configurations, thereby adjusting the bandwidth between each of GPUs 30 and 36, respectively.

Figure 5:
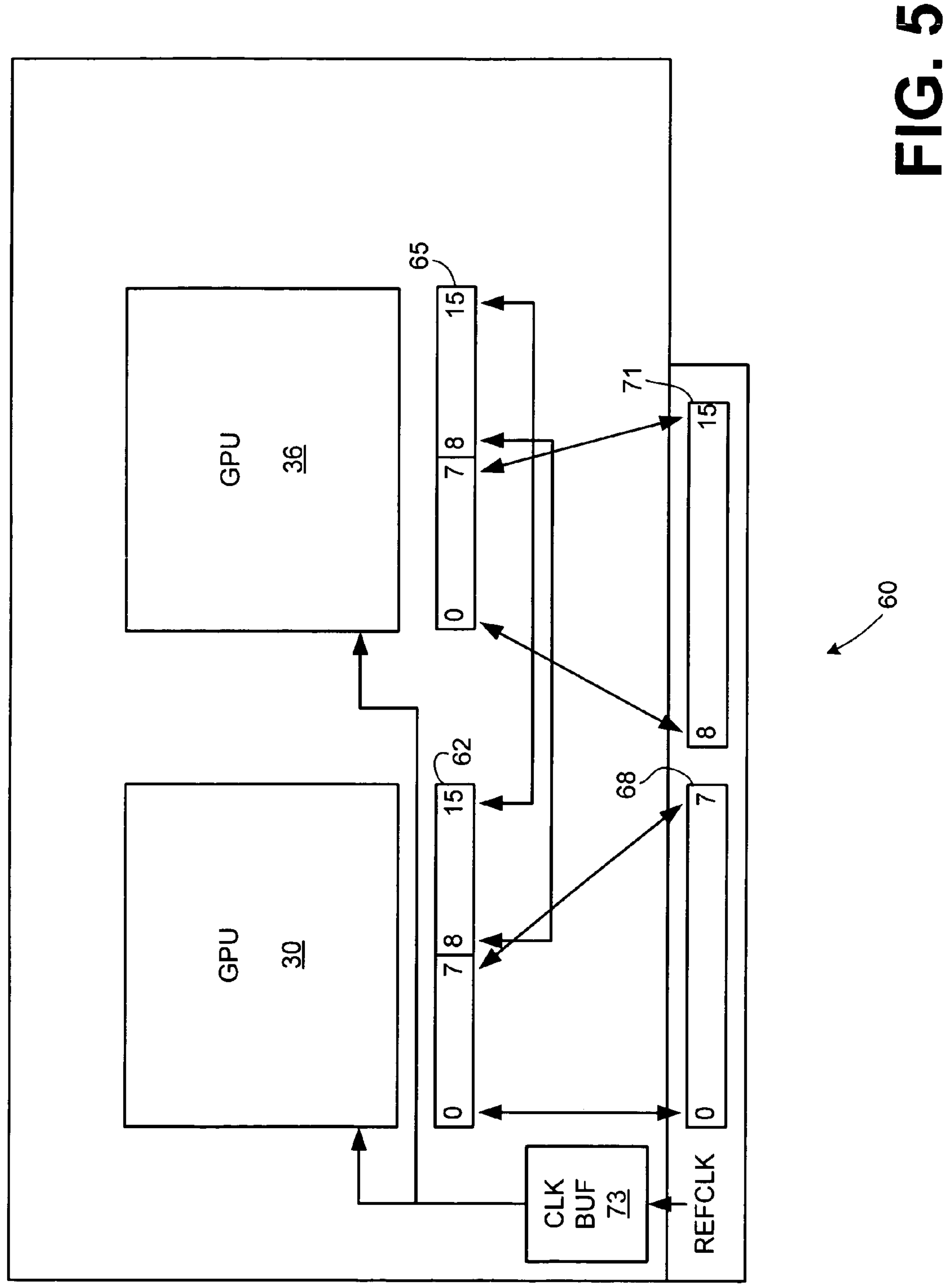
FIG. 5 is a diagram of a graphics card having two separate GPUs located on a graphics card that may be implanted on the computer of FIG. 4.

As one implementation of a dual graphics card format, which is depicted in FIG. 4, separate graphics engines may be placed on a single card that has a single connection with north bridge chip 14 of FIG. 4. FIG. 5 is a diagram of a graphics card 60 having two separate GPUs 30, 36 located on graphics card 60. In this nonlimiting example, a first GPU 30 and a second GPU 36 are configured to work in conjunction with each other for all graphics processing operations. In this way, the first GPU 30 has an interface 62 and the second GPU 36 has an interface 65. Each of interfaces 62 and 65 are configured as 16 lane PCIe links, each numbered as 0 to 15, as shown in FIG. 5.

As described above, 8 PCIe lanes are used for each of the first and second GPUs 30 and 36 for communication with north bridge chip 14 of FIG. 4. Therefore, the first 8 PCIe lanes of interface 62, or lanes numbered as 0-7, are coupled to the pins 0-7 of connector 68. Therefore, data communicated between the first GPU 30 and north bridge chip 14 may travel through lanes 0-7 of interface 62 and pin connections 0-7 of connector 68, and then over the 8 PCIe lanes 33 of FIG. 4.

In similar fashion, the second GPU 36 communicates with north bridge chip 14 via lanes 0-7 of interface 65. More specifically, the first 8 PCIe lanes of interface 65 (numbered as lanes 0-7) are coupled to connection points 8-15 of connector 71, which is referenced as connection points 8-15. Thus, data communicated between the second GPU 36 and north bridge chip 14 is routed through lanes 0-7 of interface 65, connection points 8-15 of connector 71, and across 8 PCIe lanes 38 of FIG. 4. One of ordinary skill in the art would, therefore, understand that the graphics card 60 of FIG. 5 has 16 PCIe lanes that are divided equally between GPUs 30 and 36.

In this nonlimiting example, inter-GPU communication takes place on the graphics card 60 between the lanes 8-15 in each of interfaces 62 and 65, respectively. As shown in FIG. 5, lanes 8-15 of interface 62 are coupled via a PCIe link to lanes 8-15 of interface 65. GPUs 30 and 36 of FIG. 5 may therefore communicate over 8 high bandwidth communication lanes in order to coordinate processing of various graphics operations.

In this nonlimiting example, graphics card 60 may also include a reference clock input that is coupled to north bridge chip 14 so that a clock buffer 73 coordinates processing of each of GPUs 30 and 36. However, one or more other clocking configurations may work as well.

Figure 6:
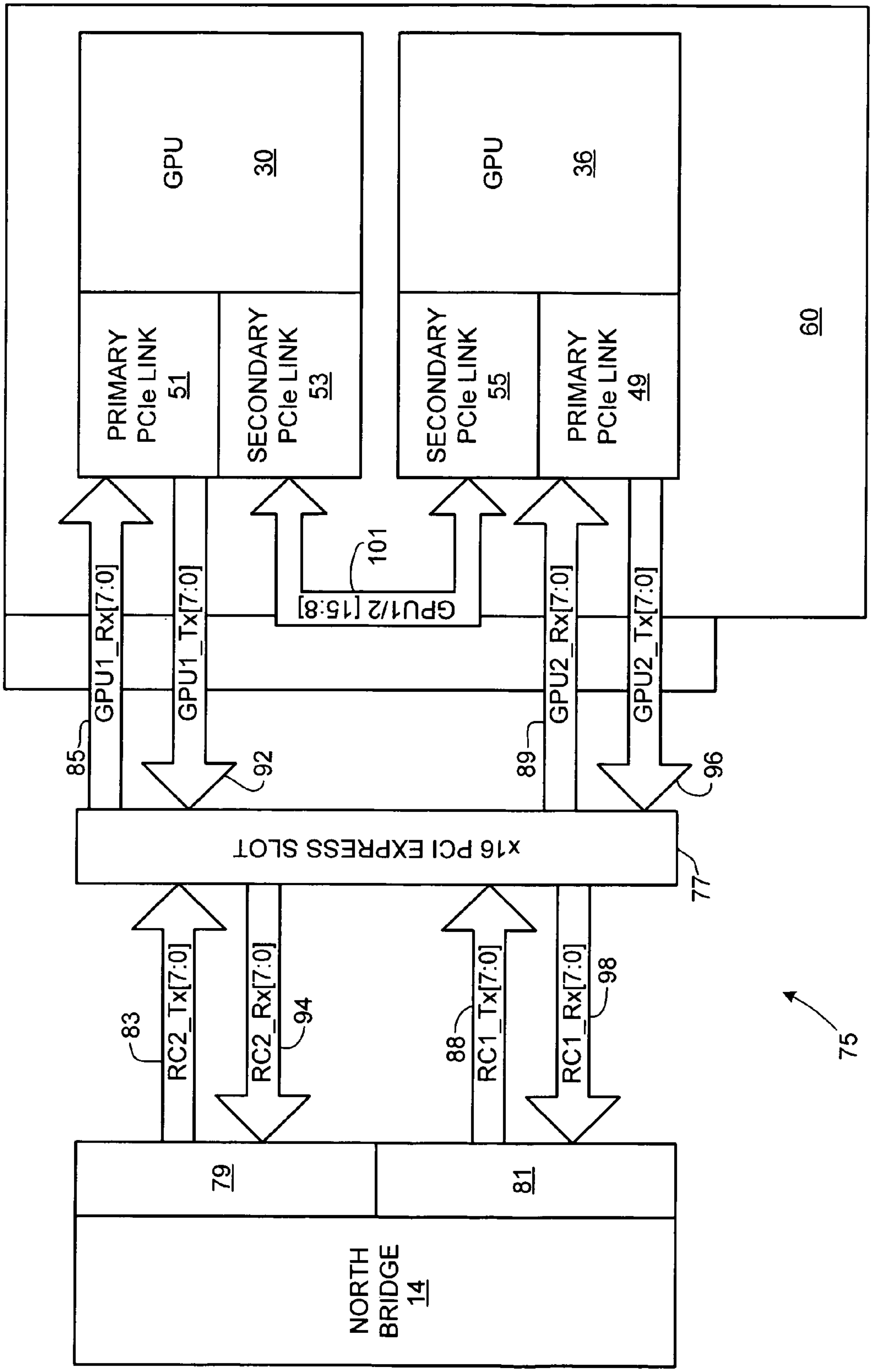
FIG. 6 is a diagram of a logical connection between the graphics card of FIG. 5 and north bridge chip of FIG. 4.

FIG. 6 is a diagram of a logical connection 75 between the graphics card 60 of FIG. 5 and north bridge chip 14 of FIG. 4. In this nonlimiting example, GPUs 30 and 36 are coupled on a single card to ×16 PCIe slot 77 that is further coupled to north bridge chip 14. More specifically, north bridge chip 14 includes connection interface 79 and 81 that is configured for routing communications to PCIe slot 77.

In this nonlimiting example, communications, which may include data, commands, and other related instructions may be routed through lanes 0-7 of interface 79 to PCIe slot 77, as represented by communication path 83. Communication path 83 may be further relayed to the primary PCIe link 51 for GPU 30 via communication path 85. More specifically, PCIe lanes 0-7 of primary PCIe link 51 may receive the logical communication 85. Likewise, return traffic may be routed through lanes 0-7 of primary PCIe link 51 to PCIe slot 77 via logical communication path 92 and further on to interface 79 via logical communication path 94, which may be configured on a printed circuit board. These communication paths occur on lanes 0-7 and are therefore configured as an 8 lane PCIe link between north bridge chip 14 and GPU 30.

In communicating with GPU 36, north bridge chip 14 routes communications through interface 81 via communication path 88 (on a printed circuit board) over lanes 0-7 to PCIe slot 77. GPU 36 receives this communication from PCIe slot 77 via communication path 89 that is coupled to the receiving lanes 0-7, which are coupled to primary PCIe link 49. For communications that GPU 36 communicates back to north bridge chip 14, primary PCIe link 49 routes such communications over lanes 0-7, as shown in communication path 96 to PCIe slot 77. Interface 81 receives the communication from GPU 36 via communication path 98 on receiving lanes 0-7. In this way, as described above, GPU 36 has an 8 lane PCIe link with north bridge chip 14.

Each of GPUs 30 and 36 include a secondary link 53, 55 respectively for inter-GPU communication. More specifically, an ×8 PCIe link 101 may be established between each of GPU 30 and 36 at links 53 and 55, respectively. Lanes 8-15 for each of the secondary links 53, 55 are utilized for this communication path 101. Thus, each of GPUs 30 and 36 are able to communicate with each other to maintain prosecution harmony of graphics related operations. Stated another way, inter-GPU communication, at least in this nonlimiting example, is not routed through PCIe slot 77 and north bridge chip 14, but is instead maintained on graphics card 60.

It should further be understood that north bridge chip 14 in FIG. 6 supports two ×8 PCIe links. As may be implemented, the 16 communication lanes from north bridge chip 14 may be routed on the motherboard to one ×16 PCIe slot 77, as shown in FIG. 6. Thus, in this nonlimiting example, the motherboard, for which the implementation of FIG. 6 may be configured, does not include signal switches. Furthermore, as discussed in more detail below, the BIOS for north bridge chip 14 may configure the multiple GPU modes upon recognition of dual GPUs 30 and 36. Plus, as described above, inter-GPU communication between each of GPUs 30 and 36 may occur on graphics card 60 and not be routed through north bridge chip 14, thereby increasing the speed and not distracting north bridge chip 14 from other operations.

Because graphics card 60 with its dual GPUs 30 and 36 utilize a single ×16 lane PCIe slot 77, existing SLI configured motherboards may be set to one ×16 mode and therefore utilize the dual processing engines with no further changes. Furthermore, the graphics card 60 of FIG. 6 may operate with an existing SLI configured north bridge chip 14 and even a motherboard that is not configured for multiple graphics processing engines. This is in part the result from the fact that no additional signal switches or additional SLI card is implemented in this nonlimiting example.

Figure 7:
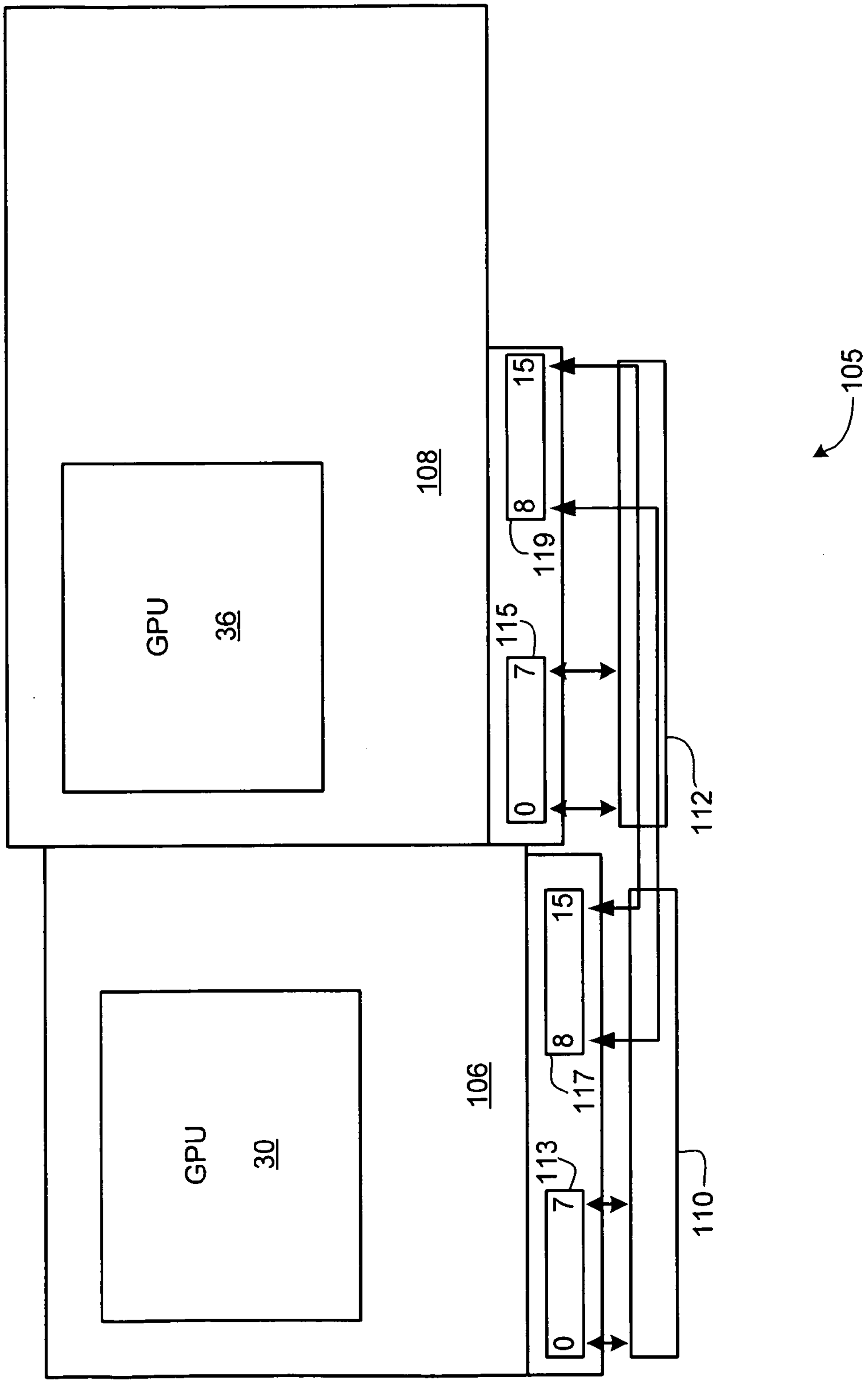
FIG. 7 is a diagram depicting communication paths for the GPUs of FIG. 4, which are configured on separate cards.

As an alternate embodiment, the multiple GPU configuration may be implemented wherein each of GPU 30 and 36 are located on separate graphics cards. FIG. 7 is a diagram 105 of a nonlimiting example wherein graphics cards 106 and 108 each include a separate graphics processing engine 30 and 36. In this nonlimiting example, graphics card 106 is coupled to PCIe slot 110 which has 16 PCIe lanes.

Similarly, graphics card 108 with GPU 36 is coupled to PCIe slot 112, which also has 16 PCIe lanes. One of ordinary skill in the art would understand that each of PCIe slots 110 and 112 are coupled to a motherboard and further coupled to a north bridge chip 14, as similarly described above.

Each of graphics cards 106 and 108 may be configured to communicate with north bridge chip 14 and also with each other for inter-GPU traffic in the configuration shown in FIG. 7. More specifically, interface 113 on graphics card 106 may include PCIe lanes 0-7 for routing traffic directly from GPU 30 to north bridge chip 14. Likewise, GPU 36 may communicate with north bridge chip 14 by utilizing interface 115 having PCIe lanes 0-7 that couple to PCIe slot 112. Thus, lanes 0-7 of each of graphics cards 106 and 108 are utilized as 8 PCIe lanes for communications to and from GPUs 30, 36.

Since GPUs 30 and 36 are on separate cards 106 and 108, inter-GPU traffic cannot take place in this nonlimiting example on a single card. Thus, PCIe lanes 8-15 on each of cards 106 and 108 are used for inter-GPU traffic. In FIG. 7, interface 117 comprises PCIe lanes 8-15 for graphics card 106, and interface 119 includes PCIe lanes 8-15 for graphics card 108. The motherboard for which PCIe slots 110 and 112 are coupled may be configured so as to route communications between interface 117 and 119, each including PCIe lanes 8-15, to each other. Thus, in this way, GPUs 30 and 36 are still able to communicate with each other and coordinate graphics processing operations.

Figure 8:
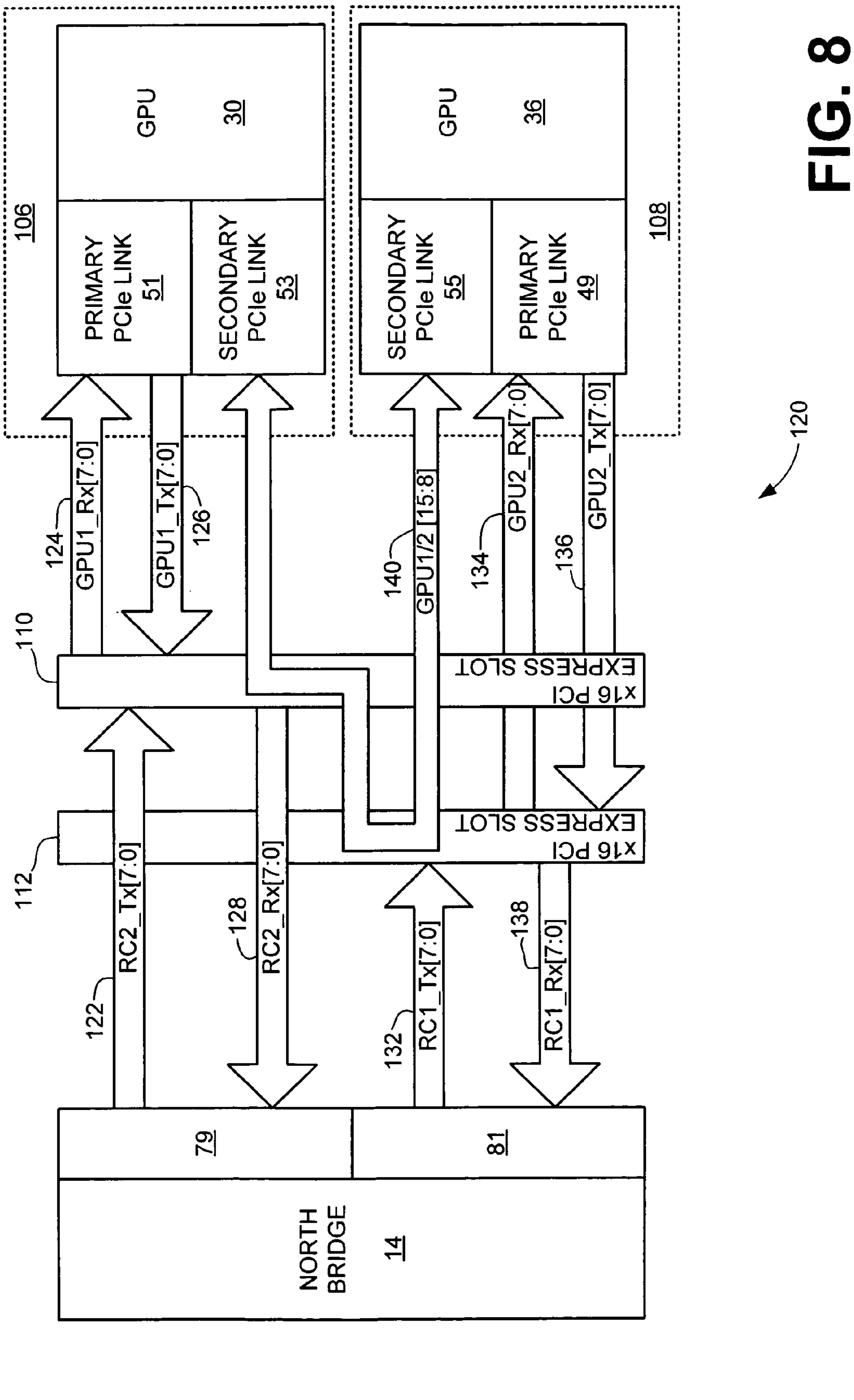
FIG. 8 is a diagram of the logical communication paths for the dual graphics cards of FIG. 7.

FIG. 8 is a diagram 120 of the dual graphics cards 106 and 108 of FIG. 7 and the logical communication paths with north bridge chip 14. In this nonlimiting example, graphics card 106 is coupled to PCIe slot 110, which is configured with 16 lanes. Likewise, graphics card 108 is coupled to PCIe slot 112, also having 16 communication lanes. Thus, in returning to FIG. 7, GPU 30 on graphics card 106 may communicate with north bridge chip 14 via its primary PCIe link interface 51. In this way, north bridge chip 14 may utilize interface 79 to communicate instructions and other data over logical path 122 to PCIe slot 110, which forwards the communication via path 124 (back to FIG. 8) to the primary PCIe link interface 51. More specifically, lanes 0-7 on graphics card 106 are used to receive this communication on logical path 124. For return communications, the transmission paths of lanes 0-7 are utilized from primary PCIe link interface 51 to PCIe slot 110 via communication path 126. Communications are thereafter forwarded back to interface 79 from PCIe slot 110 via communication path 128. More specifically, the receive lanes 0-7 of interface 79 receive the communication on communication path 128.

Graphics card 108 communicates in a similar fashion as graphics card 106. More specifically, interface 81 on north bridge chip 14 uses the transmission paths of lanes 0-7 to create a communication path 132 that is coupled to PCIe slot 112. The communication path 134 is received at primary PCIe link interface 49 on graphics card 108 in the receive lanes 0-7.

Return communications are transmitted on the transmission lanes of 0-7 from primary PCI link interface 49 back to PCIe slot 112 and are thereafter forwarded to interface 81 and received in lanes 0-7. Stated another way, communication path 138 is routed from PCIe slot 112 to the receiving lanes 0-7 of interface 81 for north bridge 14. In this way, each of graphics cards 106 and 108 maintain individual 8 PCIe communication lanes with north bridge chip 14. However, inter-GPU communication does not take place on a single card, as the separate GPUs 30 and 36 are on different cards in this nonlimiting example. Therefore, inter-GPU communication takes place via PCIe slots 110 and 112 on the motherboard for which the GPU cards are coupled.

In this nonlimiting example, the graphics cards 106 and 108 each have a secondary PCIe link 53 and 55 that corresponds to lanes 8-15 of the 16 total communication lanes for the card. More specifically, lanes 8-15 coupled to secondary link 53 on graphics card 106 enable communications to be received and transmitted between PCIe slot 110 for which graphics card 106 is coupled. Such communications are routed on the motherboard to PCIe slot 112 and thereafter to communication lanes 8-15 of the secondary PCIe link 55 on graphics card 108. Therefore, even though this implementation utilizes two separate 16 lane PCIe slots, 8 of the 16 lanes in the separate slots are essentially coupled together to enable inter-GPU communication.

In this configuration of FIG. 8, the north bridge chip 14 supports two separate ×8 PCIe links. The two links are utilized separately for each of GPUs 30 and 36. In this configuration, therefore, the motherboard for which this implementation may be configured actually supports 16 lanes but is split across two 8 lane slots in each of PCIe slots 110 and 112. However, to effectuate the inter-GPU communication between GPUs 30 and 36, in this nonlimiting example, additional signal switches may be included on the motherboard in order to support applications involving single and multiple graphics processing cards. Stated another way, implementations may exist wherein a single graphics card is utilized in a first PCIe slot, such as PCIe slot 110, and other implementations, wherein both graphics cards 106 and 108 are utilized.

The configuration of FIG. 8 may be implemented wherein one or more sets of switches is included on the motherboard between the coupling of north bridge chip 14 and the PCIe slots 110 and 112. This added switching level enables communications from GPU engines 30 and 36 to be routed to each other, as well as to the north bridge chip 14, depending upon the desired address location for a particular communication.

Figure 9:
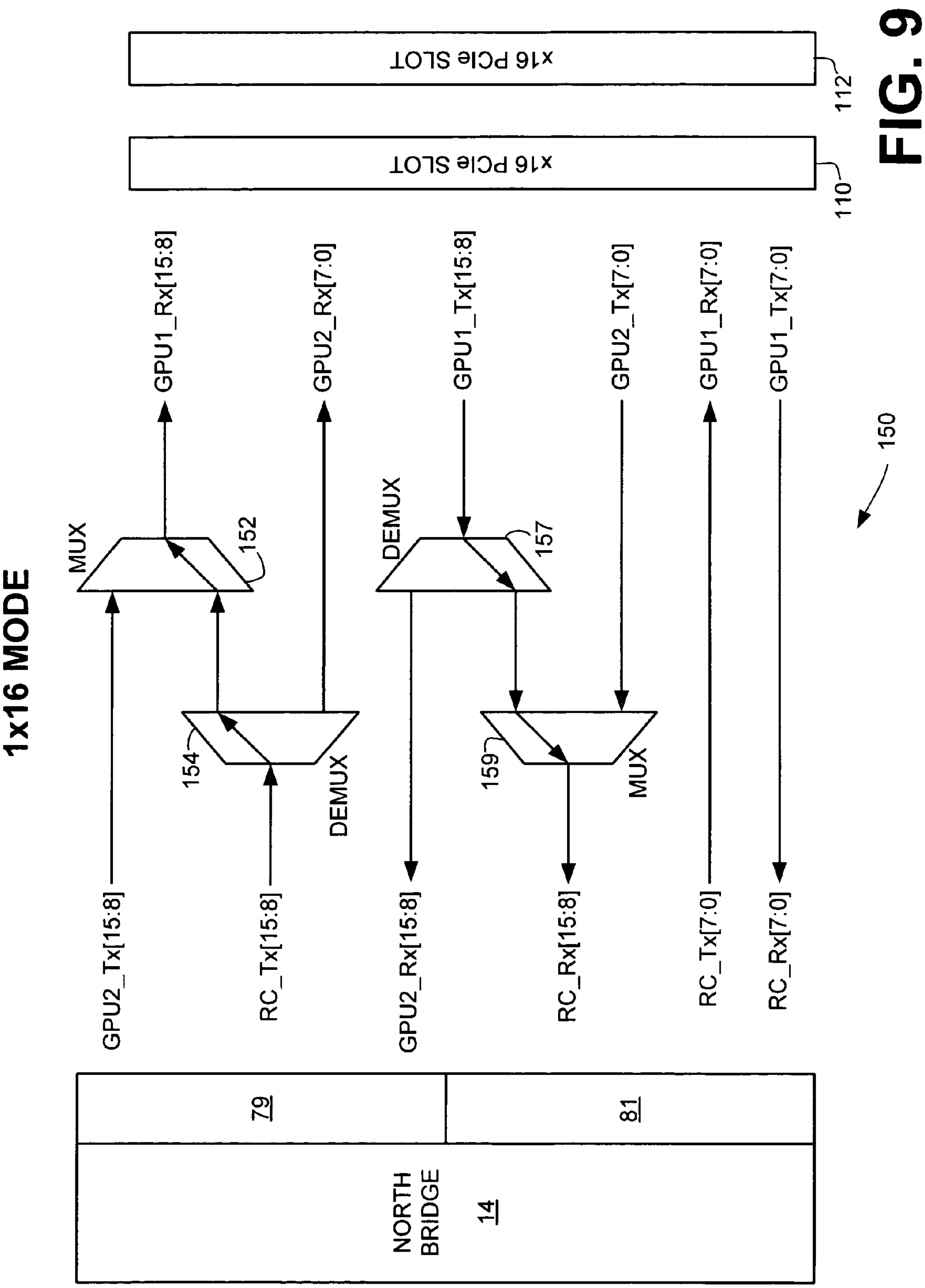
FIG. 9 is a diagram of a switching configuration set for 1×16 mode that may be implemented on a motherboard for routing communications between the north bridge chip of FIG. 8 and one of the dual graphics cards of FIG. 8.

FIG. 9 is a diagram 150 of a switching configuration that may be implemented on a motherboard for routing communications between north bridge chip 14 and dual graphics cards that may be coupled to each of PCIe slots 110 and 112 of FIG. 8. In this nonlimiting example, the switches may be configured for one graphics card coupled to the motherboard in a 1×16 format, irrespective of whether a second graphics card is or is not available.

As described above, north bridge chip 14 may be configured with 16 lanes dedicated for graphics communications. In the nonlimiting example shown in FIG. 9, transmissions on lanes 0-7 from north bridge chip 14 may be coupled via PCIe slot 110 to receiving lanes 0-7 of GPU 30. Conversely, the transmission lanes 0-7 for GPU 30 may also be coupled via PCIe slot 110 with the receiving lanes 0-7 of north bridge chip 14. In this way, the lanes 0-7 of north bridge chip 14 are utilized for communication with GPU 30 and may be reserved for communication with GPU 30.

Configuration 150 of FIG. 9 also enables determination of whether one or two GPUs are coupled to the motherboard for application. If only GPU 30 is coupled to PCIe slot 110, then the switches shown in FIG. 9 may be set as shown so that the PCIe lanes 8-15 of GPU 30 are coupled with the lanes 8-15 of north bridge chip 14.

More specifically, GPU 30 may transmit outputs on lanes 8-15 to demultiplexer 157 which may be coupled to an input into multiplexer 159, which may be switched to the receiving lanes 8-15 of north bridge chip 14. For return communications, north bridge chip 14 may transmit on lanes 8-15 to demultiplexer 154 that itself may be coupled into multiplexer 152. Multiplexer 152 may be switched such that it couples the output of demultiplexer 154 with the receiving lanes 8-15 of GPU 30.

Figure 10:
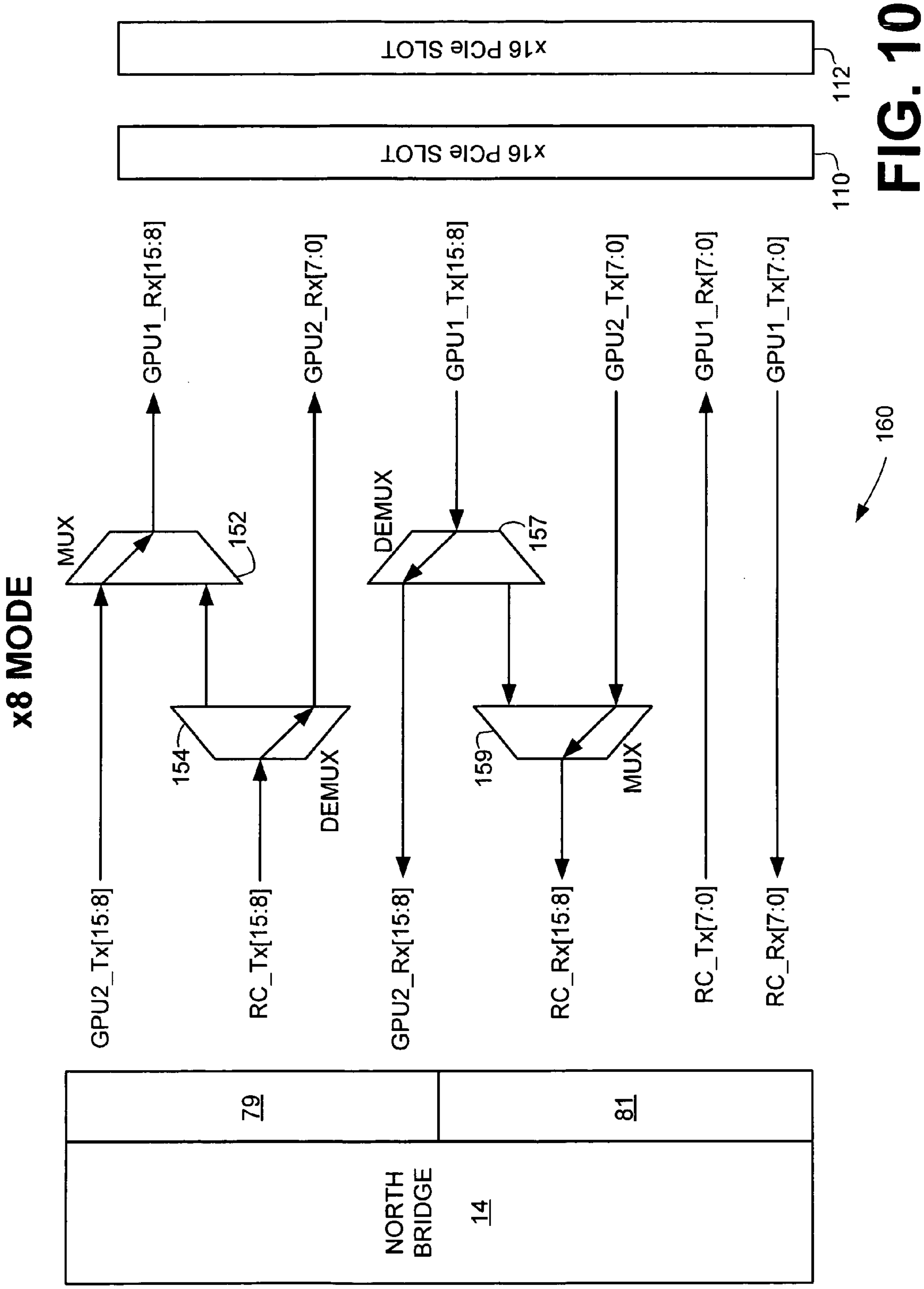
FIG. 10 is a diagram of the switch configuration of FIG. 9 set for ×8 mode for routing communication between the dual GPUs of FIG. 8.

FIG. 10 is a diagram 160 of an implementation wherein switches 152, 154, 157, and 159 may be configured for a second graphics card coupled to PCIe slot 112 in ×8 mode. Upon detecting the presence of the second GPU 36, the switches shown in FIG. 10 may be configured to allow for inter-GPU traffic.

More specifically, which the transmission and receiving lanes 0-7 of GPU 30 may remain unchanged with the configuration of FIG. 9, the other communication paths may be changed. Thus, transmissions on lanes 0-7 of GPU 36 may be routed through PCIe slot 112 and multiplexer 159 to the receiving lanes 8-15 of north bridge chip 14. Conversely, transmissions from north bridge chip 14 to GPU 36 may be communicated from lanes 8-15 of north bridge chip 14 to demultiplexer 154 to receiving lanes 0-7 of GPU 36.

Inter-GPU traffic transmissions from GPU 36 over lanes 8-15 may be forwarded to multiplexer 152 and on to receiving lanes 8-15 of GPU 30. Similarly, inter-GPU traffic communicated on transmission lanes 8-15 from GPU 30 may be forwarded to demultiplexer 157 and on to receiving lanes 8-15 of GPU 36. As a result, north bridge chip 14 maintains 2×8 PCIe lanes with each of GPUs 30 and 36 in this configuration 160 of FIG. 10.

As described above in regard to FIG. 5, two GPUs 30 and 36 may be configured on a single graphics card 60 wherein inter-GPU communication may be routed over PCIe lanes 8-15 between the two GPU engines. However, instances may exist wherein an application only utilizes one GPU engine, thereby leaving the second GPU engine in an idle and/or unused state. Thus, switches may be utilized on graphics card 60 so as to direct the output lanes 8-15 from graphics engine 30 to the output interface 71 also corresponding to lanes 8-15 instead of to the second GPU engine 36.

Figure 11:
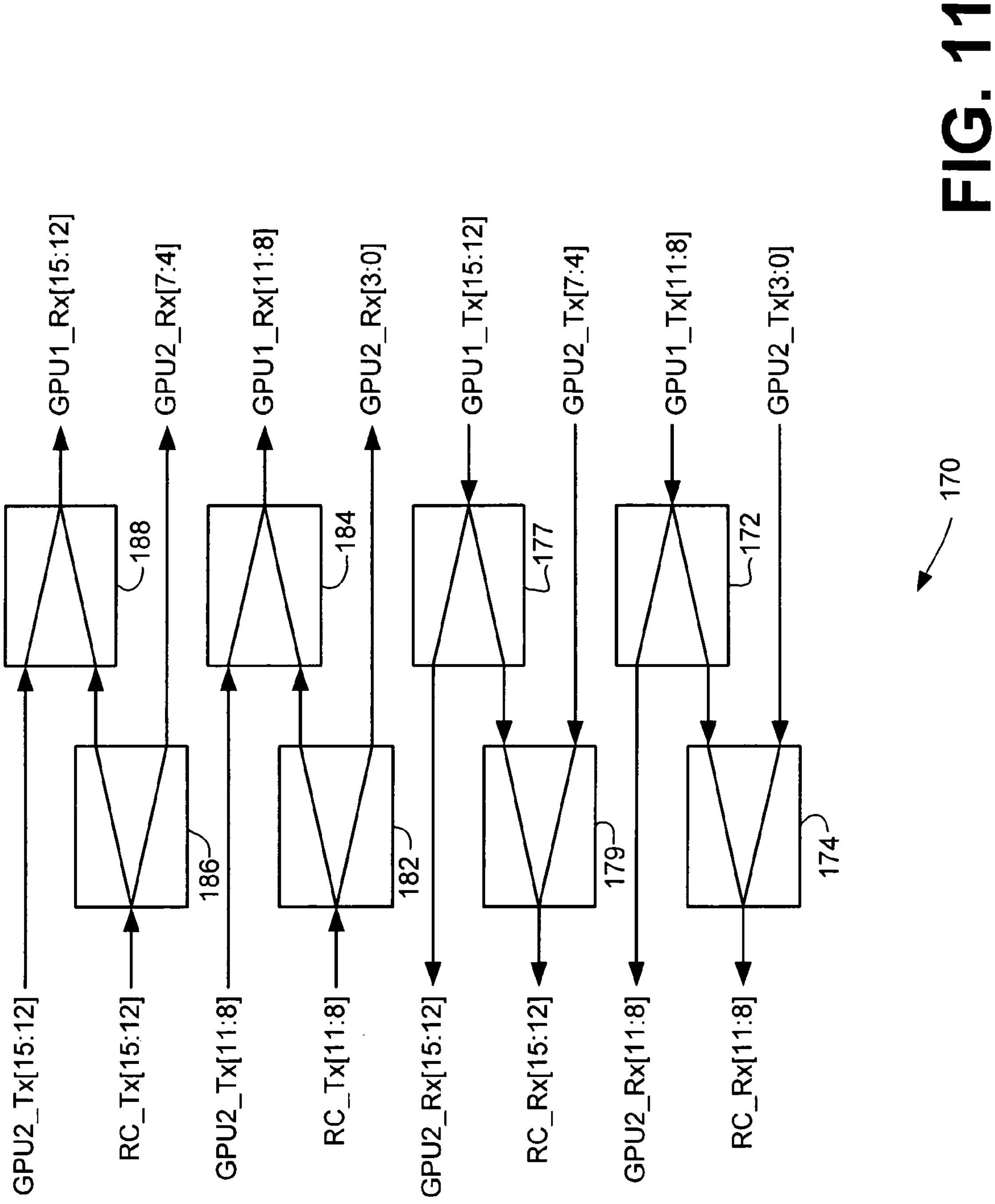
FIG. 11 is a diagram of the switches that may be configured on graphics card of FIG. 5, wherein two GPUs are configured on the card.

FIG. 11 is a nonlimiting exemplary diagram 170 of the switches that may be configured on graphics card 60 of FIG. 5, wherein two GPUs 30, 36 are configured on the graphics card 60. If only the first GPU 30 is implemented on graphics card 60, switches 172 and 174 may be configured such that transmissions on lanes 8-11 from GPU 30 may be coupled to the receiving lanes 8-11 of north bridge chip 14.

Conversely, switches 182 and 184 may be similarly configured such that transmissions from north bridge chip 14 on lanes 8-11 may be routed to receiving lanes 8-11 of GPU 30, which is the first graphics engine on graphics card 60. The same switching configuration is set for lanes 12-15 of the first GPU 30. Switches 177 and 179 may be configured to couple transmissions on lanes 12-15 from GPU 30 to the receiving lanes 12-15 of north bridge chip 14.

Likewise, transmissions from lanes 12-15 of north bridge chip 14 may be coupled via switches 186 and 188 through receiving lanes 12-15 of GPU 30. Consequently, if only GPU 30 is utilized for a particular application, such that GPU 36 is disabled or otherwise maintained in an idle state, the switches described in FIG. 11 may route all communications between lanes 8-15 of GPU 30 and north bridge chip lanes 8-15.

However, if graphics card 60 activates GPU 36, then the switches described above may be configured so as to route communications from GPU 36 to north bridge chip 14 and also to provide for inter-GPU traffic between each of GPUs 30 and 36.

In this nonlimiting example wherein GPU 36 is activated, transmissions on lanes 0-3 may be coupled to receiving lanes 8-11 of north bridge 14 via switch 174. That means, therefore, that switch 172 toggles the output of lanes 8-11 of GPU 30 to the receiving lanes 8-11 of GPU 36, thereby providing four lanes of inter-GPU communication.

Likewise, transmissions on lanes 4-7 of GPU 36 may be output via switch 179 to receiving input lanes 12-15 of north bridge chip 14. In this situation, switch 177 therefore routes transmissions on lanes 12-15 of GPU 30 to lanes 12-15 of GPU 36.

Switch 182 may also be reconfigured in this nonlimiting example such that transmissions from lanes 8-11 of north bridge chip 14 are coupled to receiving lanes 0-3 of GPU 36, which is the second GPU engine on graphics card 60 in this nonlimiting example. This change, therefore, means that switch 184 couples the transmission output on lanes 8-11 to the receiving input lanes 8-11 of GPU 30, thereby providing four lanes of inter-GPU communication.

Finally, switch 186 may be toggled such that the transmissions on lanes 12-15 are coupled to the receiving lanes 4-7 of GPU 36. This change also results in switch 188 coupling transmissions on lanes 12-15 of GPU 36 with the receiving lanes 12-15 of GPU 30, which is the first GPU engine of graphics card 60. In this second configuration, each of GPUs 30 and 36 have eight PCIe lanes of communication with north bridge chip 14, as well as eight PCIe lanes of inter-GPU traffic between each of the GPUs on graphics card 60.

Figure 12:
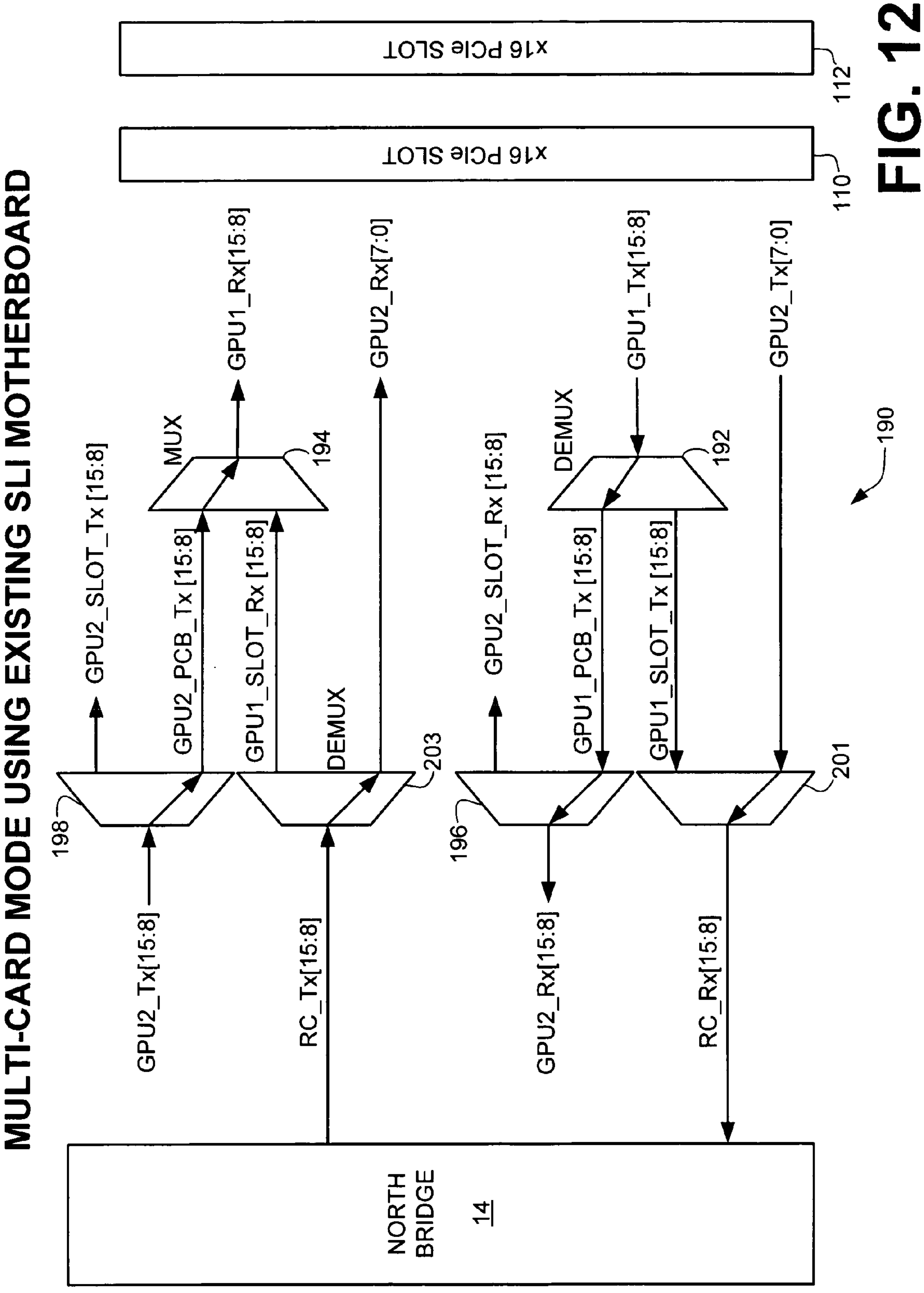
FIG. 12 is a nonlimiting exemplary diagram wherein two graphics cards, such as in FIG. 7, may be used with an existing motherboard configured according to scalable link interface technology (SLI).

FIG. 12 is a nonlimiting exemplary diagram 190 wherein two graphics cards may be used with an existing motherboard configured according to scalable link interface technology (SLI). SLI technology may be used to link two video cards together by splitting the rendering load between the two cards to increase performance, as similarly described above. In an SLI configuration, two physical PCIe slots 110 and 112 may still be used; however, a number of switches may be used to divert 8 PCIe data lanes to each service slot, as similarly described above. However, in this nonlimiting example, there is no established communication path of 8 PCIe lanes between the GPU cards for inter-GPU communications. Consequently, at least one solution involves providing an additional bridge between the graphics card printed circuit boards for the two GPUs coupled to each of PCIe slots 110 and 112.

For this reason, then, the diagram 190 of FIG. 12 provides a switching configuration wherein the features of this disclosure may be used on an SLI motherboard while still utilizing an interconnection between the two graphics cards that includes 8 PCIe lanes. In this nonlimiting example, demultiplexer 192 and multiplexer 194 may be configured on graphics card 106, which may include GPU 30 and may also be coupled to PCIe slot 110. Similarly, multiplexer 196 and demultiplexer 198 may be logically positioned on graphics card 108, which includes GPU 36 and also couples to PCIe slot 112. In this configuration, the SLI configured motherboard may include demultiplexer 201 and multiplexer 203 as part of north bridge chip 14.

In this nonlimiting example, graphics cards 106 and 108 may be essentially identical and/or otherwise similar cards in configuration, both having one multiplexer and one demultiplexer, as described above. As also described above, an interconnect may be used to bridge the communication of 8 PCIe lanes between each of graphic cards 106 and 108. As a nonlimiting example, a bridge may be physically placed on coupling connectors on the top portion of each card so that an electrical communication path is established.

In this configuration, transmissions on lanes 0-7 from GPU 36 on graphics card 108 may be coupled via multiplexer 201 to the receiving lanes 8-15 of north bridge chip 14. Transmissions from lanes 8-15 of GPU 30 may be demultiplexed by demultiplexer 192 and coupled to the input of multiplexer 196 on graphics card 108 such that the output of multiplexer 196 is coupled to the input lanes 8-15 of GPU 36. In this nonlimiting example, the output from demultiplexer 192 communicates over the printed circuit board bridge to an input of multiplexer 196.

Continuing with this nonlimiting example, transmissions on lanes 8-15 from north bridge chip 14 may be coupled to the receiving lanes 0-7 of GPU 36 on graphics card 108 via multiplexer 203 logically located at north bridge 14. Also, inter-GPU traffic originated from GPU 36 on lanes 8-15 may be routed by demultiplexer 198 across the printed circuit board bridge to multiplexer 194 on graphics card 106. The output of multiplexer 194 may thereafter route the communication to the receiving lanes 8-15 of GPU 30. In this configuration, therefore, a motherboard configured for SLI mode may still be configured to utilize multiple graphics cards according to this methodology.

Figure 13:
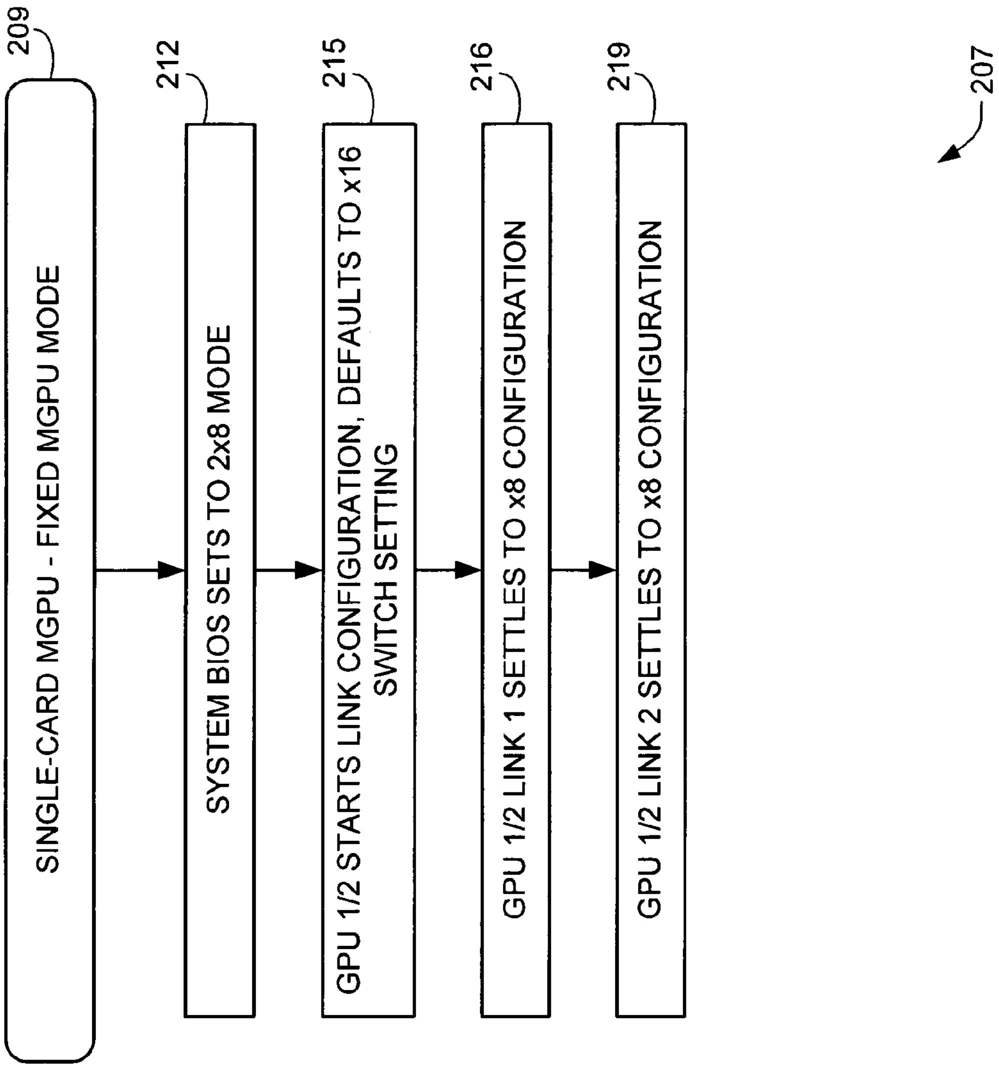
FIG. 13 is a flowchart diagram of a process implemented wherein the single graphics card of FIG. 5 has multiple GPUs and is configured to operate in multiple GPU mode.

In each of the configurations described above, wherein a single or multiple GPU configuration may be implemented, the initialization sequence may vary according to whether the GPUs are on a single or multiple cards and whether the single card has one or more GPUs attached thereto. Thus, FIG. 13 is a diagram 207 of a process implemented wherein a single card has multiple GPUs 30 and 36 and is fixed in multiple GPU mode. Stated another way, the diagram 207 may be implemented in instances such as where graphics card 60 of FIG. 5 has two GPU 30 and 36 and such that where both engines are activated for operation.

In this nonlimiting example, the process starts at starting point 209, which denotes the case as fixed multiple GPU mode. In step 212, system BIOS is set to 2×8 mode, which means that two groups of 8 PCIe lanes are set aside for communication with each of the graphics GPUs 30 and 36. In step 215, each of GPUs 30 and 36 start a link configuration and default to 16 lane switch setting configurations. However, in step 216, the first links of each of the GPUs (such as GPU 30 and 36) settle to an 8 lane configuration. More specifically, the primary PCI interfaces 51 and 49 on each of GPUs 30 and 36, respectively, as shown in FIG. 6, settle to an 8-lane configuration. In step 219, the secondary link of each of GPUs 30 and 36, which are referenced as links 53 and 55 in FIG. 6, also settle to an 8-lane PCIe configuration. Thereafter, the multiple GPUs are prepared for graphics operations.

Figure 14:
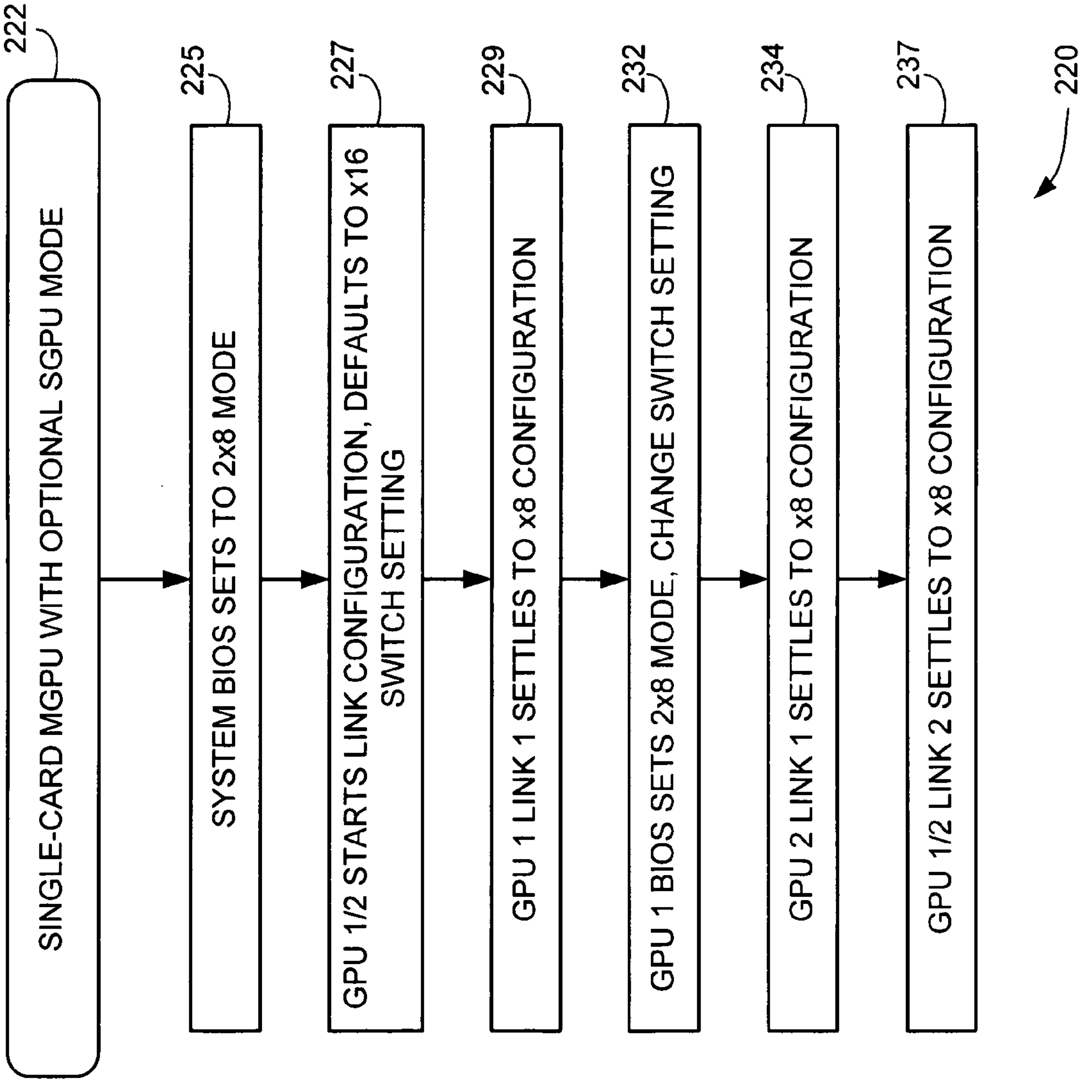
FIG. 14 is a flowchart diagram of a process wherein the single graphics card of FIG. 5 has two GPUs but is configured to operate in single GPU mode.

FIG. 14 is a diagram 220 of a process wherein a starting point 222 is the situation involving a single graphics card 60 (FIG. 5) having at least two GPUs 30 and 36 but with an optional single GPU engine mode. In step 225, system BIOS is set to 2×8 mode, as similarly described above. Thereafter, in step 227, each GPU begins its linking configuration process and defaults to a 16 switch setting, as if it were the only GPU card coupled to the motherboard. However, in step 229, the first GPU (GPU 30) has its PCIe link as its primary PCIe link 51 settled to an 8-lane PCIe configuration. In step 232, the first GPU (GPU 30) BIOS is established at a 2×8 mode and changes its switch settings as described above in FIGS. 9-11.

In step 234, the second GPU (GPU 36) has its primary PCIe link 49 settle to an 8-lane PCIe configuration, as in similar fashion to step 229. Thereafter, each GPU secondary link (link 53 with GPU 30 and link 55 with GPU 36) settles to an 8-lane PCIe configuration for inter-GPU traffic.

Figure 15:
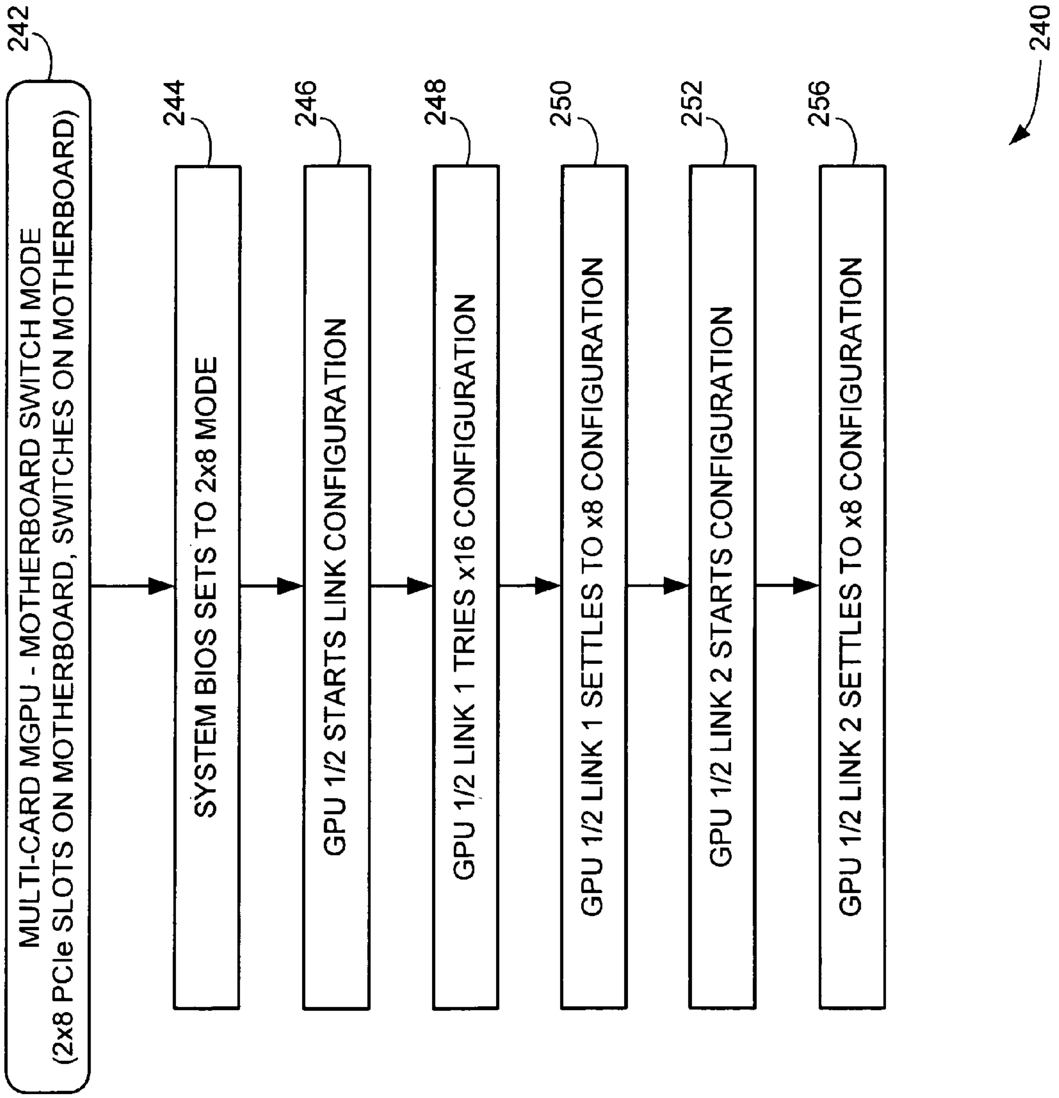
FIG. 15 is a flowchart diagram of a process for a multicard GPU, such as in FIG. 7, may be used with a motherboard configured with switching capabilities.

A third sequence of GPU initialization may be depicted in diagram 240 of FIG. 15. FIG. 15 is a flowchart diagram of the initialization sequence for a multicard GPU for use with a motherboard configured with switching capabilities.

Starting point 242 describes this diagram 240 for the situation wherein multiple cards are interfaced with a motherboard such that the motherboard is configured for switching between the cards, as described above regarding FIGS. 8 and 9. In this nonlimiting example, system BIOS is set to ×8 mode in step 244. Each of the graphics cards' GPUs begin link configuration initialization in step 246. For the primary PCI links 51 and 49 for the respective graphics cards 106 and 108, a 16-lane configuration is attempted initially, as shown in step 248. However, the primary PCI link interfaces 51 and 49 for each of the graphics cards 106 and 108 ultimately settle to an 8-lane PCI configuration in step 250. Thereafter, in step 252, the secondary links 53 and 55 for each of graphics cards 106 and 108 begin configuration processes. Ultimately, in step 256, the secondary links 53 and 55 settle to an 8-lane PCIe configuration for inter-GPU traffic.

Figure 16:
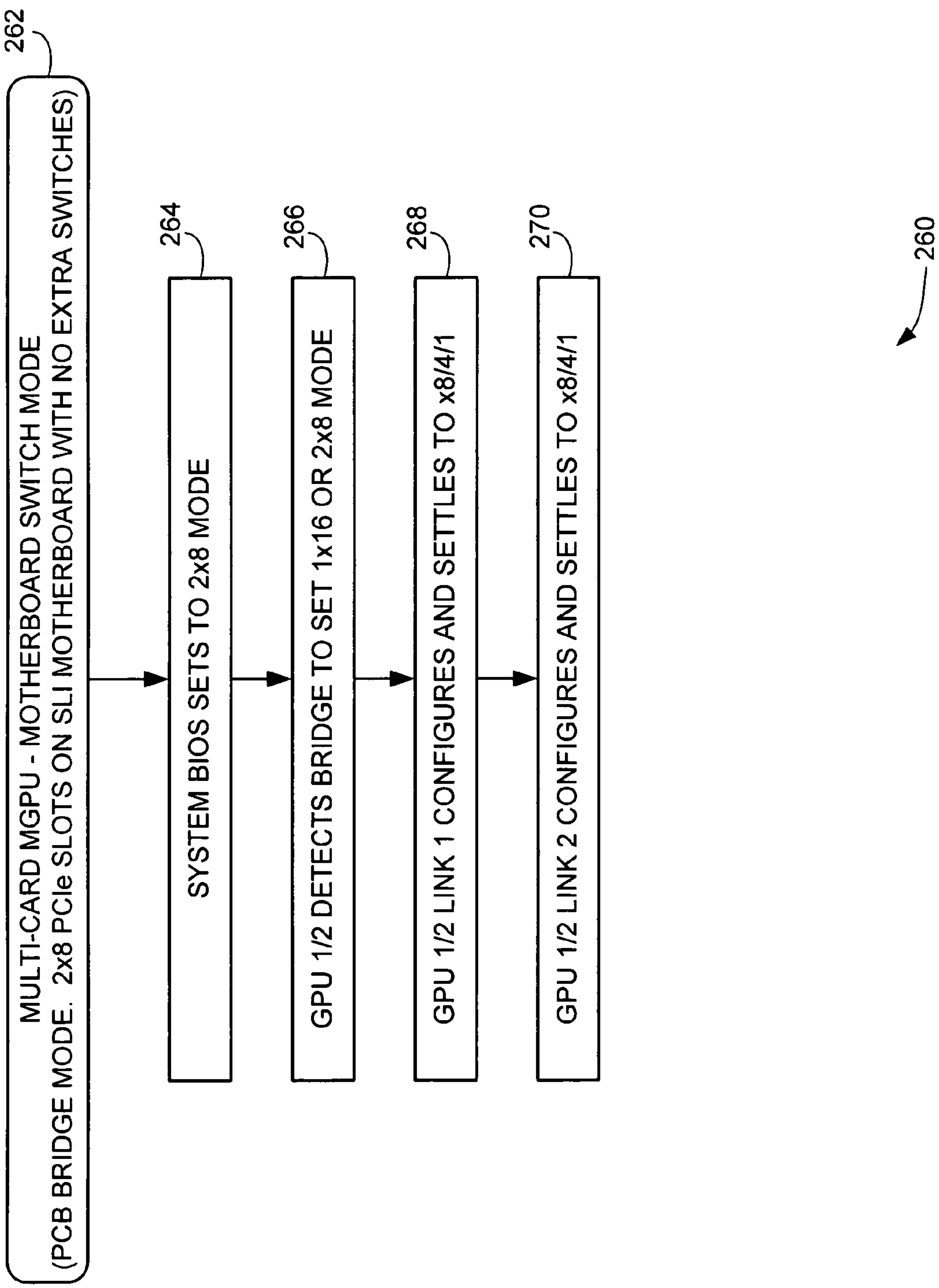
FIG. 16 is a flowchart diagram of a process that may be implemented wherein multiple GPUs are used on an SLI motherboard implementing a bridge configuration, as described in regard to FIG. 12.

FIG. 16 is a diagram 260 of a process that may be implemented wherein multiple GPUs are used on an SLI motherboard implementing a bridge configuration, as described in regard to FIG. 12. As discussed in starting point 262, the multicard GPU format may be implemented on a motherboard involving two 8-lane PCIe slots on the motherboard with no additional switches on the motherboard. In this nonlimiting example, step 264 begins with the system BIOS being set to 2×8 mode. In step 266, each GPU 30 and 36 detects the presence of the bridge between the graphics cards 106 and 108 as described above, and sets to either 16 lane PCIe mode or two 8 lanes PCIe mode. Each of the primary PCI interfaces 51 and 49 configure and ultimately settle to either an 8 lane, 4 lane or single lane PCIe mode, as shown in step 268. Thereafter, the secondary links of each of the graphics cards (links 53 and 55, respectively) configure and also settle to either an 8, 4 or single lane configuration. Thereafter, the multiple GPUs are configured for graphics processing operations.

One of ordinary skill in the art would know that the features described herein may be implemented in configurations involving more than two GPUs. As a nonlimiting example, this disclosure may be extended to three or even four cooperating GPUs that may either be on a single card, as described above, multiple cards, or perhaps even a combination, which may also include a GPU on a motherboard.

In one nonlimiting example, this alternative embodiment may be configured to support four GPUs operating in concert in similar fashion as described above. In this nonlimiting example, 16 PCIe lanes may still be implemented but in a revised configuration as discussed above so as to accommodate all GPUs. Thus, each of the four GPUs in this nonlimiting example could be coupled to the north bridge chip 14 via 4 PCIe lanes each.

Figure 1:
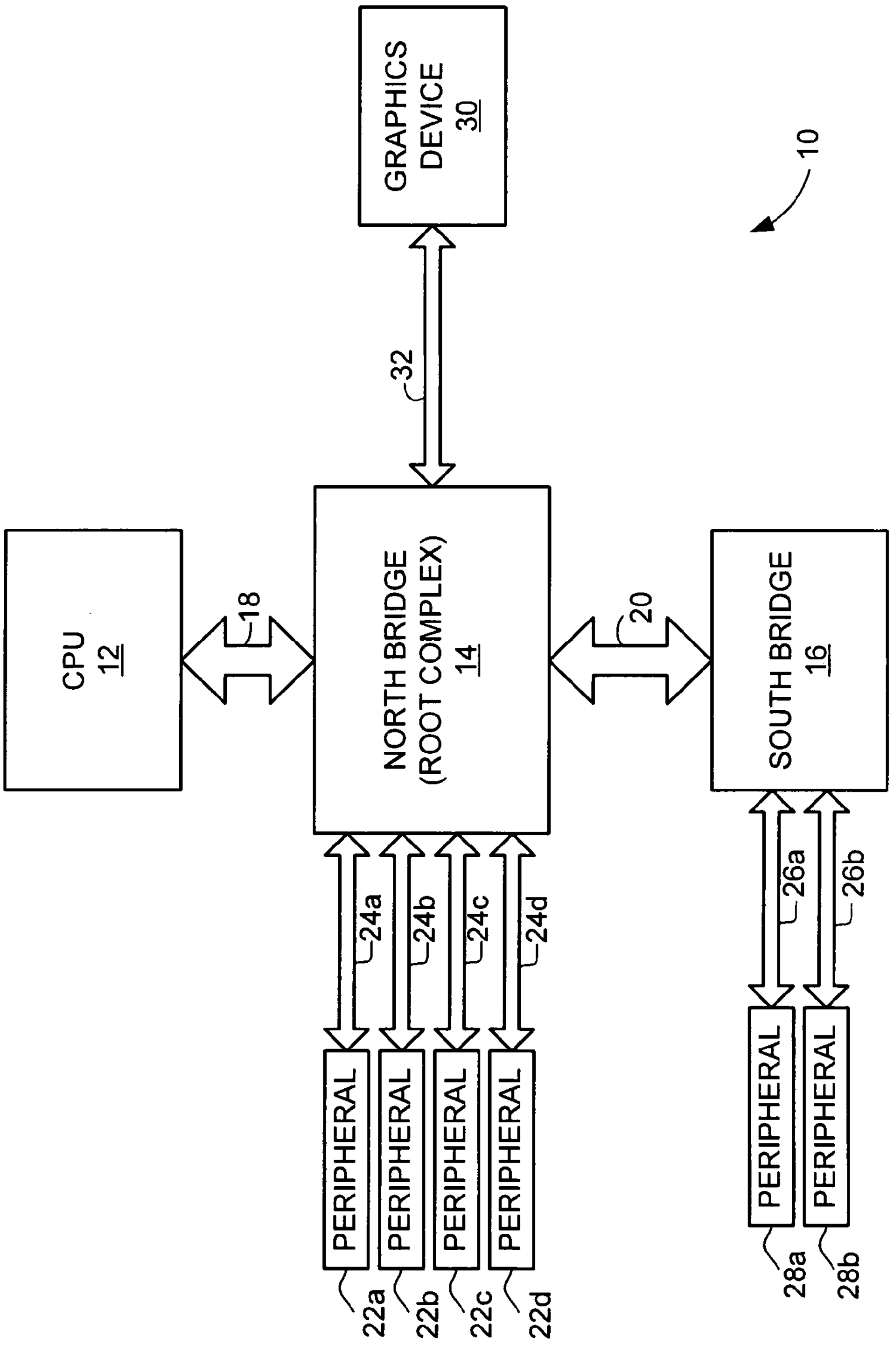
FIG. 1 is a diagram of at least a portion of a computing system, as one of ordinary skill in the art would know.
Figure 2:
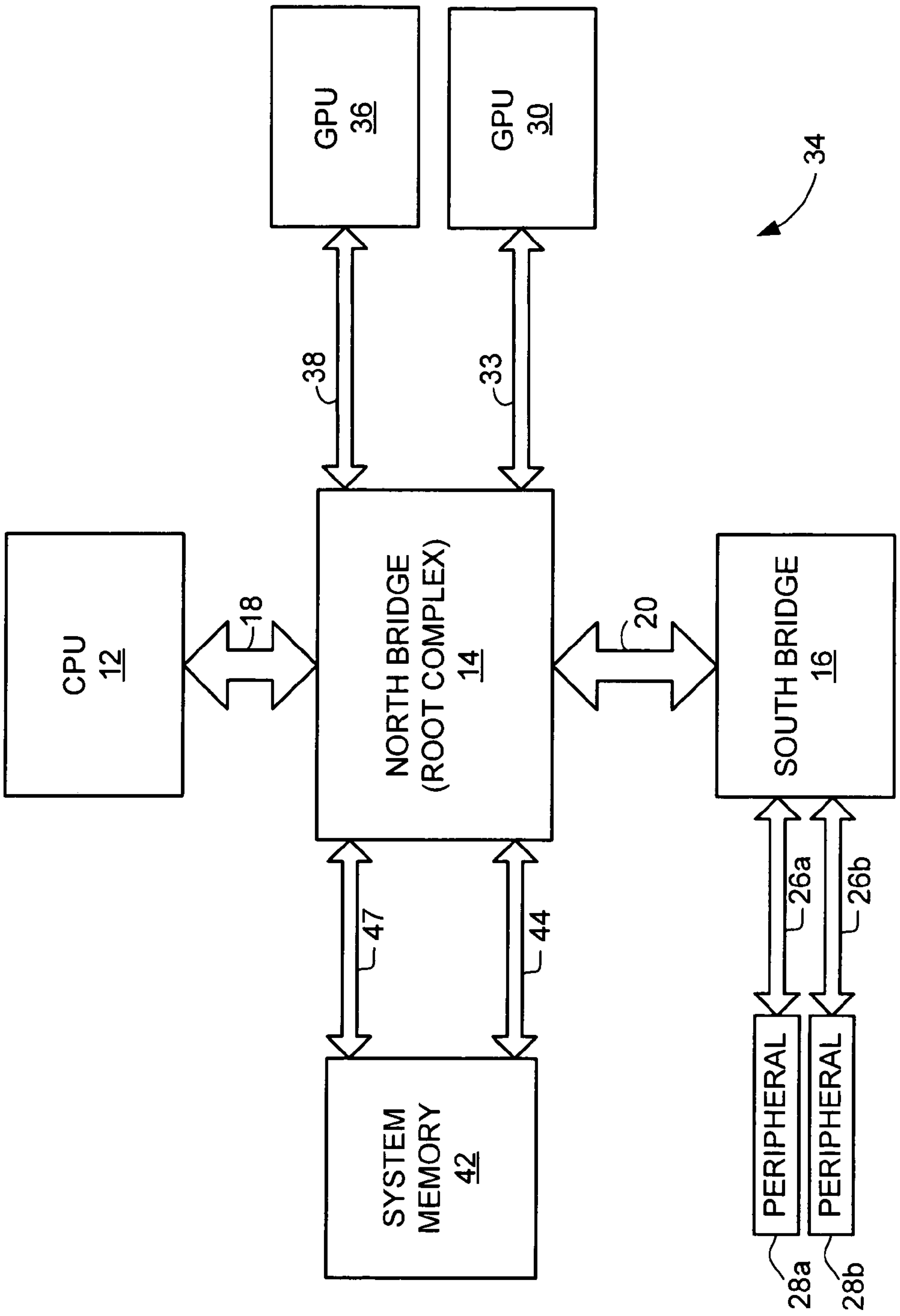
FIG. 2 is a diagram of an alternate embodiment computer of the computer of FIG. 1.
Figure 3:
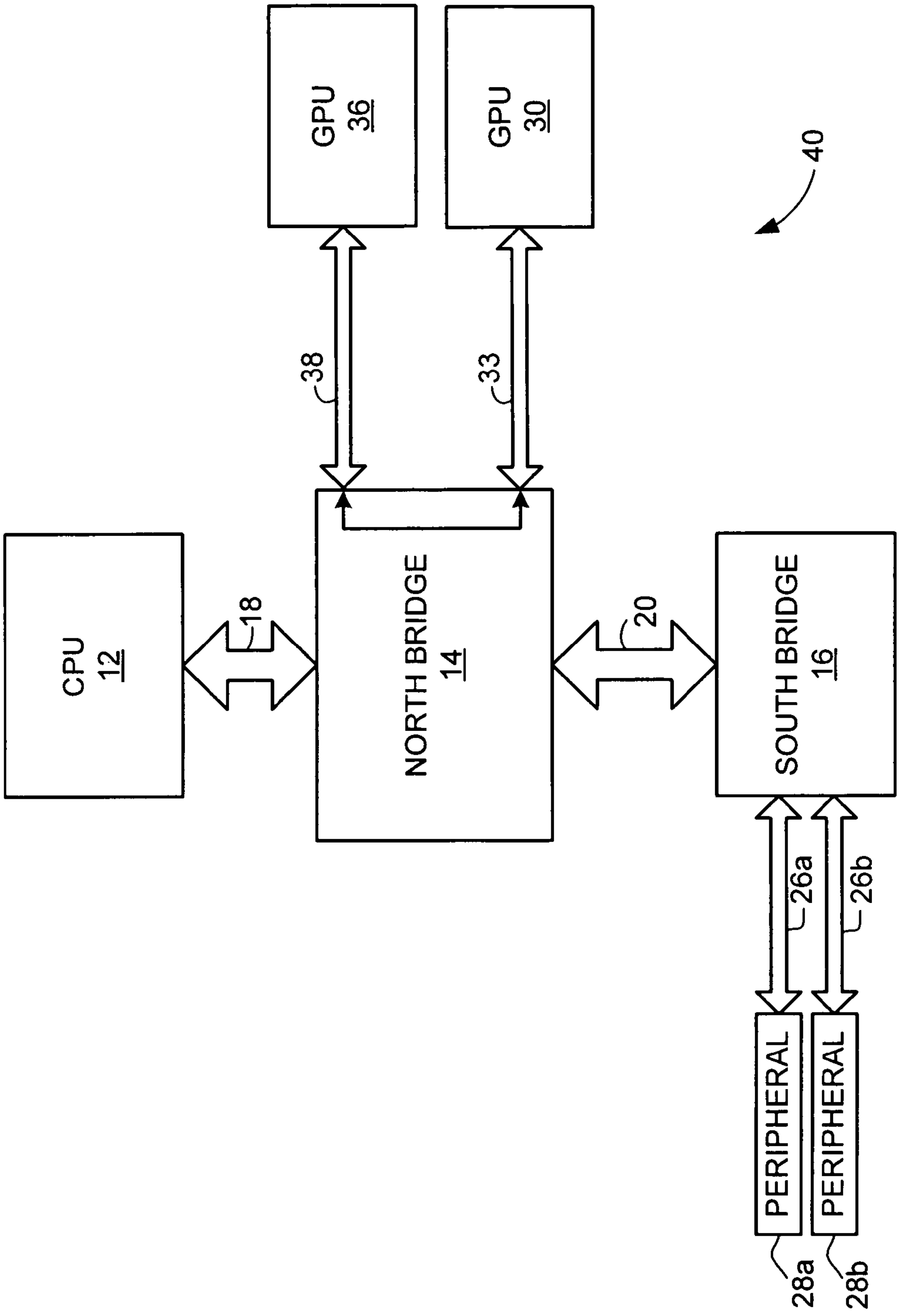
FIG. 3 is a diagram of another nonlimiting approach for a computer to support multiple graphics cards, as also depicted in FIG. 2.
Figure 17:
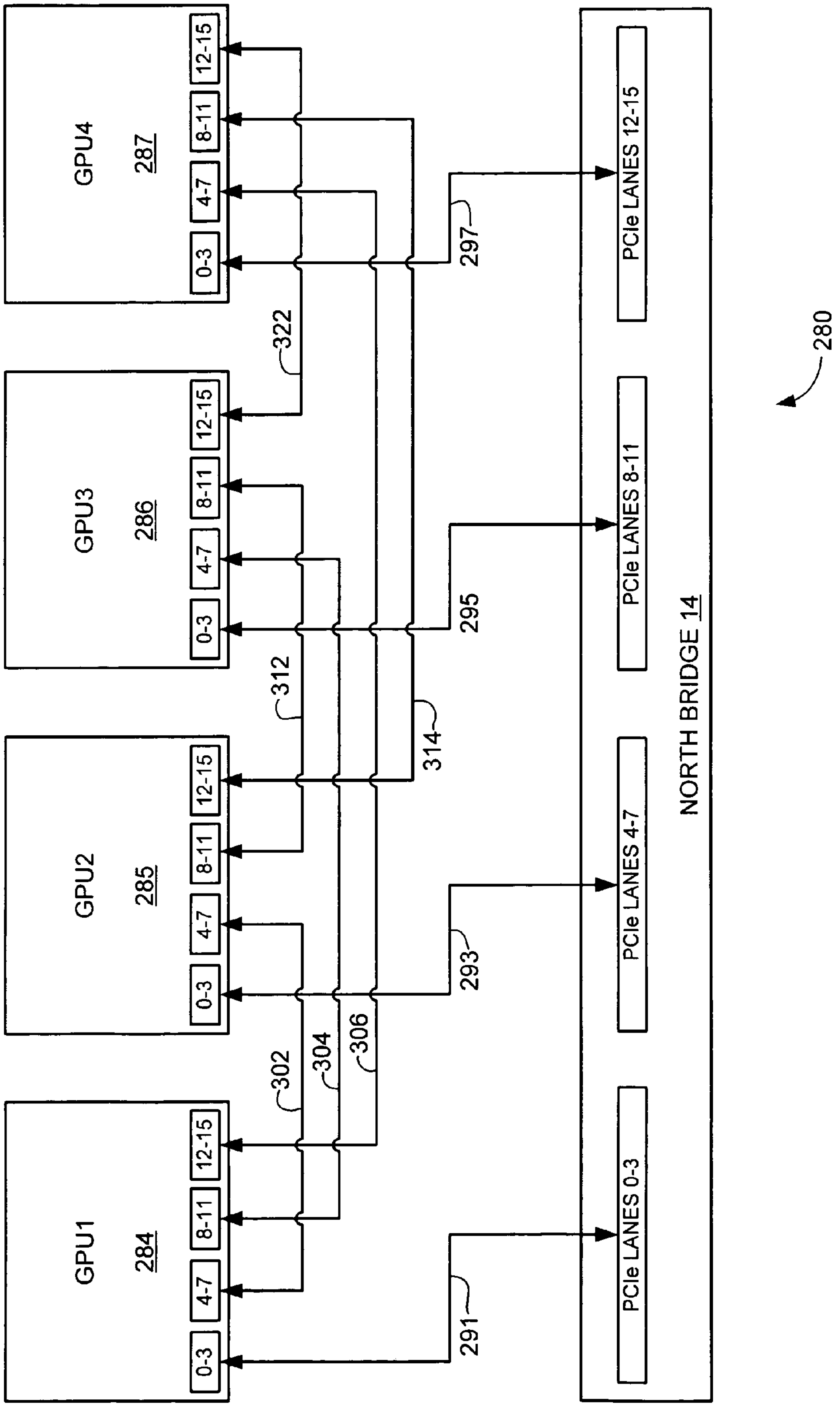
FIG. 17 is a diagram of a nonlimiting exemplary configuration wherein four GPUs are coupled to the north bridge chip 14 of FIG. 1.

FIG. 17 is a diagram of a nonlimiting exemplary configuration 280 wherein four GPUs, including GPU1 284, GPU2 285, GPU3 286, and GPU4 287, are coupled to the north bridge chip 14 of FIG. 1. In this nonlimiting example, for a first GPU, which may be referenced as GPUI 284, lanes 0-3 may be coupled via link 291 to lanes 0-3 of the north bridge chip 14. Lanes 0-3 of the second GPU, or GPU2 285, may be coupled via link 293 to lanes 4-7 of the north bridge chip 14. In similar fashion, lanes 0-3 for each of GPU3 286 and GPU4 287 could be coupled via links 295 and 297 to lanes 8-11 and 12-15, respectively, on north bridge chip 14.

As described above, these four connections paths between the four GPUs and the north bridge chip 14 consume 16 PCIe lanes at the north bridge chip 14. However, 12 free PCIe lanes for each GPU remain for communication with the other three GPUs. Thus, for GPU1 284, PCIe lanes 4-7 may be coupled via link 302 to PCIe lanes 4-7 of GPU2 285, PCIe lanes 8-11 may be coupled via link 304 to PCIe lanes 4-7 of GPU3 286, and PCIe lanes 12-15 may be coupled via link 306 to PCIe lanes 4-7 of GPU4 287.

For GPU2 285, as stated above, PCIe lanes 0-3 may be coupled via link 293 to north bridge chip 14, and communication with GPU1 284 may occur via link 302 with GPU2's PCIe lanes 4-7. Similarly, PCIe lanes 8-11 may be coupled via link 312 to PCIe lanes 8-11 for GPU3 286. Finally PCIe lanes 12-15 for GPU2 285 may be coupled via link 314 to PCIe lanes 8-11 for GPU4. Thus, all 16 PCIe lanes for GPU2 285 are utilized in this nonlimiting example.

For GPU3 286, PCIe lanes 0-3, as stated above, may be coupled via link 295 to north bridge chip 14. As already mentioned above, GPU3's PCIe lanes 4-7 may be coupled via link 304 to PCIe lanes 8-11 of GPU1 284. GPU3's PCIe lanes 8-11 may be coupled via link 312 to PCIe lanes 8-11 of GPU2 285. Thus, the final four lanes of GPU3 286, which are PCIe lanes 12-15 are coupled via link 322 to PCIe lanes 12-15 of GPU4 287.

All communication paths for GPU4 287 are identified above; however for clarification the connections may be configured as follows: PCIe lanes 0-3 via link 297 to north bridge chip 14; PCIe lanes 4-7 via link 306 to GPU1 284; PCIe lanes 8-11 via link 314 to GPU2 285; and PCIe lanes 12-15 via link 322 to GPU3 286. Thus, 16 PCIe lanes on each of the four GPUs in this nonlimiting example are utilized.

One of ordinary skill in the are would know from this alternative embodiment that different numbers of GPUs can be utilized according to this disclosure. So this disclosure is not limited to two GPUs, as one of ordinary skill would understand that topologies to connect multiple GPUs in excess of two may vary.

The foregoing description has been presented for purposes of illustration and description. It is not intended to be exhaustive or to limit the disclosure to the precise forms disclosed. Obvious modifications or variations are possible in light of the above teachings. As a nonlimiting example, instead of PCIe bus, other communication formats and protocols could be utilized in similar fashion as described above. The embodiments discussed, however, were chosen, and described to illustrate the principles disclosed herein and the practical application to thereby enable one of ordinary skill in the art to utilize the disclosure in various embodiments and with various modifications as are suited to the particular use contemplated. All such modifications and variation are within the scope of the disclosure as determined by the appended claims when interpreted in accordance with the breadth to which they are fairly and legally entitled.

The invention claimed is:

1. A method for supporting multiple graphics processing units (GPUs), comprising the steps of:

setting a switch configuration through a processor, wherein the switch configuration routes groups of communication lanes between the multiple GPUs and the processor;

communicating data between the processor and a first GPU over a first group of communication lanes, the first group of communication lanes coupled to the first GPU at an interface consisting of less than the total number of inputs/outputs for the first GPU;

communicating data between the processor and a second GPU over a second group of communication lanes, the second group of communication lanes coupled to the second GPU at an interface consisting of less than the total number of inputs/outputs for the second GPU; and communicating data between the first and second GPUs over a third group of communication lanes coupled to each of the first and second GPUs at interfaces containing a remaining number of inputs/outputs not utilized by the first and second groups of communication lanes, wherein the third group of communication lanes bypasses the processor, wherein the first and second GPUs are configured to work in conjunction with each other to perform graphics processing operations.

2. The method of claim 1, wherein the first and second groups of communication lanes total sixteen communication lanes at the processor.

3. The method of claim 1, wherein each group of communication lanes are PCI Express communication lanes.

4. The method of claim 1, wherein the first and second GPUs are physically positioned on a single graphics card.

5. The method of claim 4, wherein the third group of communication lanes is physically routed on the single graphics card.

6. The method of claim 1, further comprising the steps of:

routing communications between the first GPU and the processor and also between the first and second GPUs in accordance to whether the second GPU is activated for graphics processing operations.

7. The method of claim 6, wherein each interface of the first GPU is coupled to the processor when the second GPU is deactivated according to a position of at least one switch logically positioned between the first GPU and the processor, and wherein the processor is coupled to interfaces for each of the first and second GPUs when the second GPU is activated according to the position of the at least one switch.

8. The method of claim 1, wherein the first and second GPUs are physically positioned on a separate graphics cards.

9. The method of claim 8, wherein the third group of communication lanes is physically routed from a first graphics card containing the first GPU, on a portion of a motherboard coupled to the first graphics card, and to a second graphics card containing the second GPU coupled to the motherboard.

10. A communication system in a computer configured to support multiple graphics processing units (GPUs), comprising:

a first set of PCI Express communication lanes coupled to a first GPU and a bus of the computer, the first set of PCI Express communication lanes being less than a total number of PCI Express communication lanes available at the first GPU;

a second set of PCI Express communication lanes coupled to a second GPU and the bus, the second set of PCI Express communication lanes being less than a total number of PCI Express communication lanes available at the second GPU; and a third set of PCI Express communication lanes coupled between the first and second GPUs configured to communicate data between the first and second GPUs and being equal to or less than the number of the first or second set of PCI Express communication lanes, wherein the first and second GPUs are configured to work in conjunction with each other to perform graphics processing operations.

11. The system of claim 10, further comprising:

a first GPU primary interface configured to couple the first set of PCI Express communication lanes to the first GPU, the first set of PCI Express communication lanes further being coupled to a motherboard;

a second GPU primary interface configured to couple the second set of PCI Express communication lanes to the second GPU, the second set of PCI Express communication lanes further being coupled to a motherboard; and a secondary interface on each of the first and second GPUs configured to couple to the third set of PCI Express communication lanes.

12. The system of claim 11, wherein the first and second GPUs are configured on a single graphics card that is coupled to the motherboard according to an interface connector enabling data transfer on each of the first and second sets of PCI Express communication lanes and one or more processing devices on the motherboard.

13. The system of claim 11, wherein the first and second GPUs are configured on a single graphics card and the third set of PCI Express lanes establishes a communication path that is contained on the single graphics card.

14. The system of claim 11, wherein the first GPU is configured on a first graphics card coupled to a motherboard according to a first connection point, the first set of PCI Express communication lanes routed through the first connection point, and wherein the second GPU is configured on a second graphics card coupled to the motherboard according to a second connection point, the second set of PCI Express communication lanes routed through the second communication point, and wherein the third set of PCI Express communication lanes are routed through both the first and second connection points.

15. The system of claim 10, further comprising:

one or more additional GPUs each coupled to the bus by a set of PCI Express communication lanes and to the first GPU, second GPU and each other of the one or more additional GPUs by a set of PCI Express communication lanes, wherein each GPU is coupled to each other GPU and to the bus by a predetermined set of PCI Express communication lanes, the predetermined set of PCI Express communication lanes totaling less than the communication lane capacity of each GPU.

16. The system of claim 10, wherein each of the first, second, and third sets of PCI Express communication lanes is an ×8 PCI Express link.

17. The system of claim 10, further comprising:

logic executable by the computer to detect whether the second GPU is activated and to redirect the second set of PCI Express communication lanes to the first GPU if the second GPU is not activated.

18. The system of claim 10, further comprising:

logic executable by the computer to detect whether the second GPU is coupled to the bus and to redirect the second set of PCI Express communication lanes to the first GPU when the second GPU is not coupled to the bus.

* * * * *